US012088351B2

(12) United States Patent
Pisenti et al.

(10) Patent No.: US 12,088,351 B2
(45) Date of Patent: Sep. 10, 2024

(54) DOUBLE INDIVIDUAL-ADDRESSING MULTI-BEAM RAMAN SYSTEM

(71) Applicant: IonQ, Inc., College Park, MD (US)

(72) Inventors: Neal C. Pisenti, Laurel, MD (US); Kai Makoto Hudek, Hyattsville, MD (US); Kenneth Wright, Berwyn Heights, MD (US); Tan Liu, Frederick, MD (US); David Angeley, Charlottesville, VA (US); Nadir Shah, Reston, VA (US); Sarah Margaret Kreikemeier, Washington, DC (US)

(73) Assignee: IonQ, Inc., College Park, MD (US)

( * ) Notice: Subject to any disclaimer, the term of this patent is extended or adjusted under 35 U.S.C. 154(b) by 93 days.

(21) Appl. No.: 18/062,413

(22) Filed: Dec. 6, 2022

(65) Prior Publication Data
US 2024/0022335 A1    Jan. 18, 2024

Related U.S. Application Data

(60) Provisional application No. 63/287,002, filed on Dec. 7, 2021.

(51) Int. Cl.
    *G06N 10/40*    (2022.01)
    *H04B 10/70*    (2013.01)
(52) U.S. Cl.
    CPC ............. *H04B 10/70* (2013.01); *G06N 10/40* (2022.01)
(58) Field of Classification Search
    CPC ..................................................... G06N 10/40
    See application file for complete search history.

(56) References Cited

U.S. PATENT DOCUMENTS

| | | | |
|---|---|---|---|
| 9,858,531 B1 * | 1/2018 | Monroe | G06N 10/00 |
| 10,509,245 B2 | 12/2019 | Morse et al. | |
| 11,042,052 B2 | 6/2021 | Lange et al. | |
| 11,322,343 B2 | 5/2022 | Wong-Campos et al. | |

(Continued)

OTHER PUBLICATIONS

Herold et al., "Universal control of ion qubits in a scalable microfabricated planar trap," New Journal of Physics, 2016, vol. 18, No. 2, 12 pages.

(Continued)

*Primary Examiner* — Shi K Li
(74) *Attorney, Agent, or Firm* — ARENTFOX SCHIFF LLP

(57) ABSTRACT

Aspects of the present disclosure relate generally to systems and methods for use in the implementation and/or operation of quantum information processing (QIP) systems, and more particularly, to a double individual-addressing multi-beam Raman system for use in QIP systems. A technique is described in which a first multi-channel modulator (MCM), a first telecentric zoom lens, and a first interleaver that form a first optical path of the Raman system that receives a first array of beams and adjusts the first array of beams to individually address atomic-based qubits in a chain from a first direction. Moreover, a second MCM, a second telecentric zoom lens, and a second interleaver form a second optical path of the Raman system that receives a second array of beams and adjusts the second arrays of beams to individually address the atomic-based qubits in the chain from a second direction different from the first direction.

20 Claims, 17 Drawing Sheets

(56) References Cited

U.S. PATENT DOCUMENTS

| | | |
|---|---|---|
| 2019/0014243 A1 | 1/2019 | Malone et al. |
| 2020/0321949 A1 | 10/2020 | Debnath et al. |
| 2021/0013020 A1 | 1/2021 | Wong-Campos et al. |
| 2021/0057872 A1 | 2/2021 | Mizrahi et al. |
| 2021/0337171 A1* | 10/2021 | Saffman ................. G06N 10/00 |
| 2022/0222566 A1* | 7/2022 | Duan .................... G06N 10/40 |

OTHER PUBLICATIONS

International Search Report and Written Opinion in PCT/US2022/081106, mailed Dec. 12, 2023, 8 pages.

* cited by examiner

DOUBLE INDIVIDUAL-ADDRESSING MULTI-BEAM RAMAN SYSTEM

CROSS REFERENCE TO RELATED APPLICATIONS

The present application claims priority to and the benefit of U.S. Provisional Patent Application No. 63/287,002, entitled "DOUBLE INDIVIDUAL-ADDRESSING MULTI-BEAM RAMAN SYSTEM," and filed on Dec. 7, 2021, the contents of which are incorporated herein by reference in their entirety.

TECHNICAL FIELD

Aspects of the present disclosure relate generally to systems and methods for use in the implementation and/or operation of quantum information processing (QIP) systems, and more particularly, to a double individual-addressing multi-beam Raman system for use in QIP systems.

BACKGROUND

Trapped atoms are one of the leading implementations for quantum information processing or quantum computing. Atomic-based qubits can be used as quantum memories, as quantum gates in quantum computers and simulators, and can act as nodes for quantum communication networks. Qubits based on trapped atomic ions enjoy a rare combination of attributes. For example, qubits based on trapped atomic ions have very good coherence properties, can be prepared and measured with nearly 100% efficiency, and are readily entangled with each other by modulating their Coulomb interaction with suitable external control fields such as optical or microwave fields. These attributes make atomic-based qubits attractive for extended quantum operations such as quantum computations or quantum simulations.

It is therefore important to develop new techniques that improve the design, fabrication, implementation, and/or control of different QIP systems used as quantum computers or quantum simulators, and particularly for those QIP systems that handle operations based on atomic-based qubits.

SUMMARY

The following presents a simplified summary of one or more aspects to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

This disclosure describes various aspects of a double individual-addressing multi-beam Raman system for use in QIP systems.

Aspects of this disclosure describe a Raman system for double individual-addressing of atomic-based qubits that includes a first muti-channel modulator (MCM), a first telecentric zoom lens, and a first interleaver that with one or more optical components form a first optical path of the Raman system and are configured to receive a first array of beams and to adjust the first array of beams for each beam in the first array of beams to individually address a respective atomic-based qubit in a chain from a first direction. The Raman system also includes a second MCM, a second telecentric zoom lens, and a second interleaver that with one or more optical components form a second optical path of the Raman system and are configured to receive a second array of beams and to adjust the second arrays of beams for each beam in the second array of beams to individually address a respective atomic-based qubit in the chain from a second direction different from the first direction. The first optical path and the second optical path can be symmetrical.

In an aspect of this Raman system, each beam in the first array of beams is an elliptical beam, each beam in the second array of beams is an elliptical beam, and corresponding elliptical beams from the first array of beams and from the second array of beams substantially overlap. The elliptical beams can be Gaussian beams.

In an aspect of this Raman system, the Raman system can further include a laser source and a first diffractive optical element (DOE) and a second DOE. The laser source is configured to generate a single beam, the single beam is split and a portion is provided to the first DOE and the first DOE is configured to generate the first array of beams from the portion of the single beam, and a remaining portion of single beam is provided to the second DOE and the second DOE is configured to generate the second array of beams from the remaining portion of the single beam.

In an aspect of this Raman system, the first MCM is a first multi-channel acousto-optic modulator (AOM), and the second MCM is a second multi-channel AOM. The channels in the first multi-channel AOM include one channel for each of the beams in the first array of beams, each channel in the first multi-channel AOM is configured to independently control one or more characteristics of the respective one of the first array of beams applied to that channel, and the channels in the second multi-channel AOM include one channel for each of the beams in the second set of beams, each channel in the second multi-channel AOM is configured to independently control one or more characteristics of the respective one of the first array of beams applied to that channel. Additionally or alternatively, the first array of beams received by the first optical path has a beam spacing that matches a spacing between the channels in the first multi-channel AOM, the second array of beams received by the second optical path has a beam spacing that matches a spacing between the channels in the second multi-channel AOM, the first optical path is configured to adjust the beam spacing of the first array of beams to match a spacing of the atomic-based qubits in the chain, and the second optical path is configured to adjust the beam spacing of the second array of beams to match the spacing of the atomic-based qubits in the chain. The first optical path is further configured to adjust a beam size of the beams in the first array of beams according to an optimal size (e.g., based on adjustability and complex metrics) of the atomic-based qubits in the chain, and the second optical path is further configured to adjust a beam size of the beams in the second array of beams according to the size of the atomic-based qubits in the chain.

In an aspect of this Raman system, each of the first telecentric zoom lens and the second telecentric zoom lens has an outer pair of lenses and an inner pair of lenses, the outer pair of lenses is of fixed position and the inner pair of lenses is configured to move together to adjust an optical characteristic or the inner pair of lenses is of fixed position and the outer pair of lenses is configured to move together to adjust the optical characteristic.

In an aspect of this Raman system the first array of beams includes a first subset of beams and a second subset of beams, the first interleaver is configured to optically adjust a position the beams in the first array of beams such that beams from the first subset of beams and beams from the second subset of beams alternate and have a reduced beam spacing at an output of the first interleaver, and the second array of beams includes a first subset of beams and a second subset of beams, the second interleaver is configured to optically adjust a position of the beams in the second array of beams such that beams from the first subset of beams and beams from the second subset of beams alternate and have a reduced beam spacing at an output of the second interleaver. The first interleaver includes a first path for the first subset of beams from the first array of beams and a second path for the second subset of beams from the first array of beams, and the second interleaver includes a first path for the first subset of beams from the second array of beams and a second path for the second subset of beams from the second array of beams.

In an aspect of this Raman system, the first optical path is further formed by a first reflective dove prism, and the second optical path is further formed by a second reflective dove prism.

In an aspect of this Raman system, the first direction for each beam of the first array of beams to individually address the respective atomic-based qubit in the chain is opposite to the second direction for each beam of the second array of beams to individually address the respective atomic-based qubit in the chain.

In an aspect of this Raman system, each of the atomic-based qubits in the chain is an ion.

Aspects of this disclosure describe a method for double individual-addressing of atomic-based qubits in a Raman system, the method includes providing a first MCM, a first telecentric zoom lens, and a first interleaver that with one or more optical components form a first optical path. The method also includes providing a second MCM, a second telecentric zoom lens, and a second interleaver that with one or more optical components form a second optical path. The method further includes receiving, by the first optical path, a first array of beams and adjusting, by the first optical path, the first array of beams for each beam in the first array of beams to individually address a respective atomic-based qubit in a chain from a first direction; and receiving, by the second optical path, a second array of beams and adjusting, by the second optical path, the second arrays of beams for each beam in the second array of beams to individually address a respective atomic-based qubit in the chain from a second direction.

In an aspect of this method, each beam in the first array of beams is an elliptical beam, each beam in the second array of beams is an elliptical beam, and corresponding elliptical beams from the first array of beams and from the second array of beams substantially overlap.

In an aspect of this method, the method further includes independently controlling, in each channel of the first multi-channel MCM, one or more characteristics of the respective beam of the first array of beams applied to that channel, and independently controlling, in each channel of the second multi-channel MCM, one or more characteristics of the respective beam of the second array of beams applied to that channel.

In an aspect of this method, the method further includes adjusting, by the first optical path, a beam spacing of the first array of beams to match a spacing of the atomic-based qubits in the chain; and adjusting, by the second optical path, a beam spacing of the second array of beams to match a spacing of the atomic-based qubits in the chain.

In an aspect of this method, the first array of beams includes a first subset of beams and a second subset of beams, and the second array of beams includes a first subset of beams and a second subset of beams, the method further includes adjusting, by the first interleaver, a position of the beams in the first array of beams such that beams from the first subset of beams and beams from the second subset of beams alternate and have a reduced beam spacing at an output of the first interleaver, and adjusting, by the second interleaver, a position of the beams in the second array of beams such that the beams from the first subset of beams and beams from the second subset of beams alternate and have a reduced beam spacing at an output of the second interleaver.

Individual aspects of the Raman system described above can be combined to provide other contemplated implementations of the Raman system. Similarly, individual aspects of the method described above can be combined to provide other contemplated implementations of the method.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects can be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
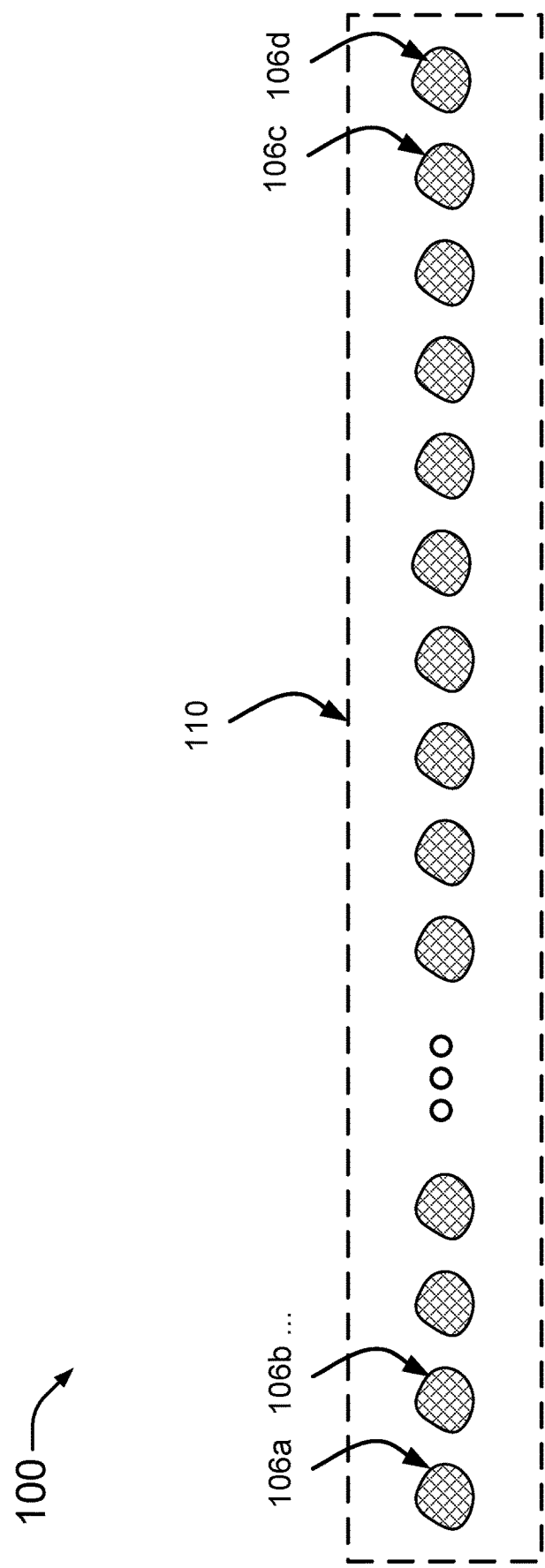
FIG. 1 illustrates a view of atomic ions a linear crystal or chain in accordance with aspects of this disclosure.

The detailed description set forth below in connection with the appended drawings or figures is intended as a description of various configurations or implementations and is not intended to represent the only configurations or implementations in which the concepts described herein can be practiced. The detailed description includes specific details for the purpose of providing a thorough understanding of various concepts. However, it will be apparent to those skilled in the art that these concepts can be practiced without these specific details or with variations of these specific details. In some instances, well known components are shown in block diagram form, while some blocks can be representative of one or more well-known components.

Previous designs of trapped ion quantum computers capable of individually addressing a large, linear array of qubits (see e.g., FIG. 1 below) with Raman laser beams used optical elements, such as a diffractive optical element (DOE), to create a linear array of individually addressing beams that were put into a multi-channel modulator (MCM), such as an acousto-optic modulator (AOM), for individual manipulation of the individually addressing beams. This was then used in combination with a large "global" addressing laser beam that addressed all qubits at the same time to achieve the overall requirements of individual addressability in a trapped ion quantum computer. The combination of a DOE and MCM for generating individual addressing beams is one example for individual addressability, and it can be done in other ways. One such example is the use of individual modulators (one per beam) that are fiber coupled and where the output of a fiber array is used to generate the individually addressing beam array.

Quantum gates could be targeted on a specific qubit or pairs of qubits in a linear array or chain of qubits (e.g., ions) by turning on one or two AOM channels on the multi-channel AOM. Quantum gates requiring more than two qubits can be realized by turning on more AOM channels in the multi-channel AOM. These individually addressed laser beams, when combined with the much larger global beam, generate the desired gate operation. This laser beam geometry has the benefit of simplicity, since the optics required to generate a large array of tightly focused individually addressed laser beams is complicated, while it is easy to generate a single "global" beam with a wide spatial profile to hit all ions in the ion trap. The individually addressed laser beams and the global beam can be provided from different directions (e.g., opposite directions).

However, there can be several challenges to this laser beam geometry. For instance, the large global beam can induce idle phase errors on the entire qubit register, even qubits not involved in a particular gate because they are still illuminated. The global beam can also increase gate crosstalk errors, which can be challenging to mitigate in all situations. Ultimately, the global beam can also increase the fundamental error due to spontaneous emission. This can occur on two fronts: first, if the laser intensity on a given ion is mismatched between the two beams, the spontaneous emission error per gate can be increased. Practically speaking, this can be true due to the non-uniform spatial profile of the global beam, such as a Gaussian spatial profile of finite width. Second, because the global beam illuminates non-target qubits, that spontaneous emission error per qubit is increased because they are still illuminated even when idle, and the spontaneous emission is multiplied by the size of your qubit register because increased spontaneous emission error per qubit increases the overall error by the number of qubits in the register.

Because of these potential challenges, it is desirable to instead have an optical system capable of individually addressing a single qubit from both sides, i.e., a double set of individually addressed Raman beams. This type of beam geometry, however, has some of its own challenges. The two sides need to generate beams which are very well matched in spacing, telecentricity, polarization, and spatial profile at the ion plane, and the beam array axis needs to be matched to the multi-channel AOM axis, which needs to be matched to the ion chain axis. There can also be a need for motorized degrees of freedom to adjust alignment in response to slow system drift.

Because the fidelity of a laser-based gate operation depends on the stability of the laser intensity and phase sampled at the ion position, tightly focused beams can increase the intensity noise due to pointing fluctuations of the beam. This noise can be reduced by reducing mechanical vibrations of the optical assembly, or by increasing the size of the beam to reduce the sensitivity to a given amount of pointing noise. Unfortunately, design constraints in multi-channel AOM devices make it challenging to design a device which can accept an arbitrary beam waist and spacing. The limitations implied by bulk optical elements means this ratio of spacing to beam waist in the AOM device must be conserved at the ion plane; having a more tightly spaced ion chain, which is desirable for many reasons unrelated to the Raman optomechanics (e.g., reduced ion heating, reduced sensitivity to stray field drift at the ion trap), would also require reduced beam waists and thus increased sensitivity to alignment drift and pointing noise.

This disclosure describes a technique to mitigate the constraints outlined above based on the use of optical interleavers, which is discussed in more detail below. This disclosure also proposes the use of cylindrical optics to increase the beam waist transverse to the ion chain axis. This has a few practical impacts. First, the gate errors due to pointing noise along that axis are reduced. Second, one-qubit and two-qubit quantum gates often require applying multiple tones on the AOM simultaneously to generate multiple laser frequency components on the ion. Each frequency component will have its own pointing offset out of the AOM, which ideally is re-imaged to the same point at the ion plane (referred to as the geometric focus). In practice, it is difficult to match the geometric focus at the same position as the Gaussian focus, where each laser beam has the highest intensity and ideal optical phase profile. The pointing shift happens along the transverse direction, in which it is possible to elongate using cylindrical optics to reduce the sensitivity to this particular alignment offset. Having at least one axis with a larger beam waist can be used to reduce certain unwanted polarization artifacts that appear as the beam waist approaches the wavelength of light. Finally, it allows matching the individually addressing beam's transverse numerical aperture (NA) to the reduced numerical aperture available in the transverse direction due to geometric constraints of the ion trap packaging, optimizing, for example, scattered light and clipping.

This disclosure also describes a system to generate a matched set of individually addressed laser beams that reduces crosstalk, utilizes laser power more efficiently, reduces phase errors on idle qubits, reduces effect of spontaneous emission (a fundamental limit), solves for new degrees of freedom (e.g., the use of a K-mirror or dove prism for fan alignment to ions, zoom lens), and addresses optical invariance (e.g., waist/spacing ratio is fixed) using an interleaver.

Solutions to the issues that can arise when implementing techniques for double individual-addressing in multi-beam Raman systems are explained in more detail in connection with FIGS. 1-15, with FIGS. 1-3 providing a background of the types of QIP systems or quantum computers, and more specifically, of atomic-based QIP systems or quantum computers, in which these techniques are implemented.

Figure 2:
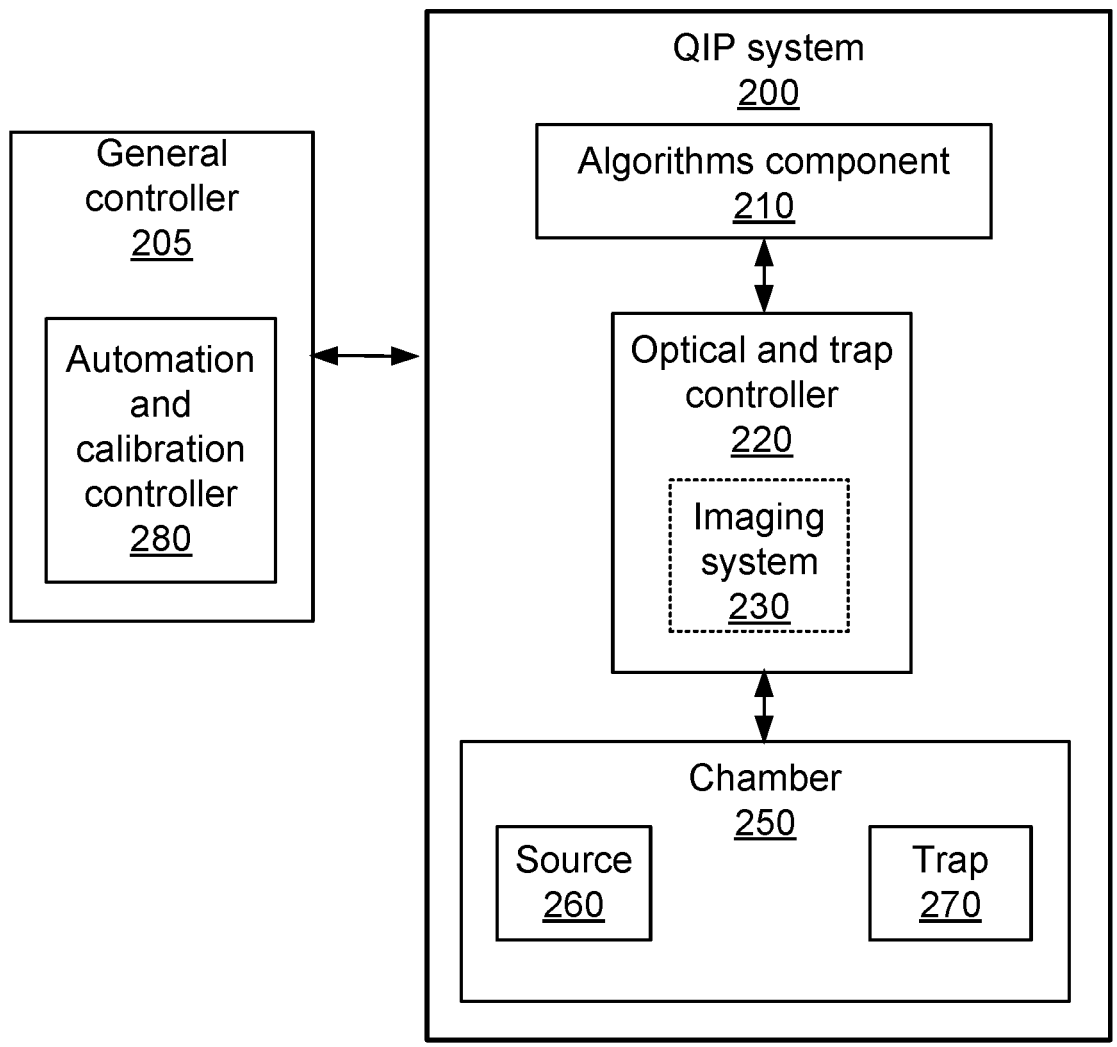
FIG. 2 illustrates an example of a quantum information processing (QIP) system in accordance with aspects of this disclosure.

FIG. 1 illustrates a diagram 100 that shows an example of multiple atomic ions 106 (e.g., atomic ions 106a, 106b, ... , 106c, and 106d) trapped in a linear crystal or chain 110 using a trap (the trap can be inside a vacuum chamber as shown in FIG. 2). The trap can be referred to as an ion trap. The ion trap shown can be built or fabricated on a semiconductor substrate, a dielectric substrate, or a glass die or wafer (also referred to as a glass substrate). The atomic ions 106 can be provided to the trap as atomic species for ionization and confinement into the chain 110.

In the example shown in FIG. 1, the trap includes electrodes for trapping or confining multiple atomic ions into the chain 110 that are laser-cooled to be nearly at rest. The number of atomic ions (N) trapped can be configurable and more or fewer atomic ions can be trapped. The atomic ions can be ytterbium ions (e.g., $^{171}Yb^+$ ions), for example. The atomic ions are illuminated with laser (optical) radiation tuned to a resonance in $^{171}Yb^+$ and the fluorescence of the atomic ions is imaged onto a camera or some other type of detection device. In this example, atomic ions can be separated by about 5 microns (μm) from each other, although the separation can be smaller or larger than 5 μm. The separation of the atomic ions is determined by a balance between the external confinement force and Coulomb repulsion and does not need to be uniform. Moreover, in addition to atomic ytterbium ions, neutral atoms, Rydberg atoms, different atomic ions or different species of atomic ions can also be used. For example, barium ions can be used, including different isotopes of barium. The trap can be a linear RF Paul trap, but other types of confinement devices can also be used, including optical confinements. Thus, a confinement device can be based on different techniques and can hold ions, neutral atoms, or Rydberg atoms, for example, with an ion trap being one example of such a confinement device. The ion trap can be a surface trap, for example.

The ions 106 in the chain 110 (or other forms of atomic-based qubits) can be individually address from different directions by using the techniques described below.

FIG. 2 illustrates an example of a block diagram of a QIP system 200. The QIP system 200 can also be referred to as a quantum computing system, a quantum computer, a computer device, a trapped ion system, or the like. The QIP system 200 can be part of a hybrid computing system in which the QIP system 200 is used to perform quantum computations and operations and the hybrid computing system also includes a classical computer to perform classical computations and operations. The quantum and classical computations and operations can interact in such a hybrid system.

Shown in FIG. 2 is a general controller 205 configured to perform various control operations of the QIP system 200. Instructions for the control operations can be stored in memory (not shown) in the general controller 205 and can be updated over time through a communications interface (not shown). Although the general controller 205 is shown separate from the QIP system 200, the general controller 205 can be integrated with or be part of the QIP system 200. The general controller 205 can include an automation and calibration controller 280 configured to perform various calibration, testing, and automation operations associated with the QIP system 200. These calibration, testing, and automation operations can involve, for example, all or part of an optical and trap controller 220 and/or all or part of a chamber 250.

The QIP system 200 can include an algorithms component 210 that can operate with other parts of the QIP system 200 to perform quantum algorithms or quantum operations, including a stack or sequence of combinations of single qubit operations and/or multi-qubit operations (e.g., two-qubit operations) as well as extended quantum computations. As such, the algorithms component 210 can provide instructions to various components of the QIP system 200 (e.g., to the optical and trap controller 220) to enable the implementation of the quantum algorithms or quantum operations. The algorithms component 210 can receive information resulting from the implementation of the quantum algorithms or quantum operations and can process the information and/or transfer the information to another component of the QIP system 200 or to another device for further processing.

The QIP system 200 can include the optical and trap controller 220 that controls various aspects of a trap 270 in the chamber 250, including the generation of signals to control the trap 270, and controls the operation of lasers and optical systems that provide optical beams that interact with the atoms or ions in the trap 270. Control of the operations of laser and optical systems can include dynamically changing operational parameters and/or configurations, including controlling positioning using motorized mounts or holders. When used to confine or trap ions, the trap 270 can be referred to as an ion trap. The trap 270, however, can also be used to trap neutral atoms, Rydberg atoms, different atomic ions or different species of atomic ions. The lasers and optical systems can be at least partially located in the optical and trap controller 220 and/or in the chamber 250. For example, optical systems within the optical and trap controller 220 and the chamber 250 can refer to optical components or optical assemblies.

The QIP system 200 can include an imaging system 230. The imaging system 230 can include a high-resolution imager (e.g., CCD camera) or other type of detection device (e.g., photomultiplier tube or PMT) for monitoring the atomic ions while they are being provided to the trap 270 and/or after they have been provided to the trap 270. In an aspect, the imaging system 230 can be implemented separate from the optical and trap controller 220, however, the use of fluorescence to detect, identify, and label atomic ions using image processing algorithms can need to be coordinated with the optical and trap controller 220.

In addition to the components described above, the QIP system 200 can include a source 260 that provides atomic species (e.g., a plume or flux of neutral atoms) to the chamber 250 having the trap 270. When atomic ions are the basis of the quantum operations, that trap 270 confines the atomic species once ionized (e.g., photoionized). The trap 270 can be part of a processor or processing portion of the QIP system 200. That is, the trap 270 can be considered at the core of the processing operations of the QIP system 200 since it holds the atomic-based qubits that are used to perform the quantum operations or simulations. At least a portion of the source 260 can be implemented separate from the chamber 250.

It is to be understood that the various components of the QIP system 200 described in FIG. 2 are described at a high-level for ease of understanding. Such components can include one or more sub-components, the details of which can be provided below as needed to better understand certain aspects of this disclosure.

Aspects of this disclosure can be implemented at least partially using the optical and trap controller 220, the imaging system 230, and/or the chamber 250 of the QIP system 200.

Figure 3:
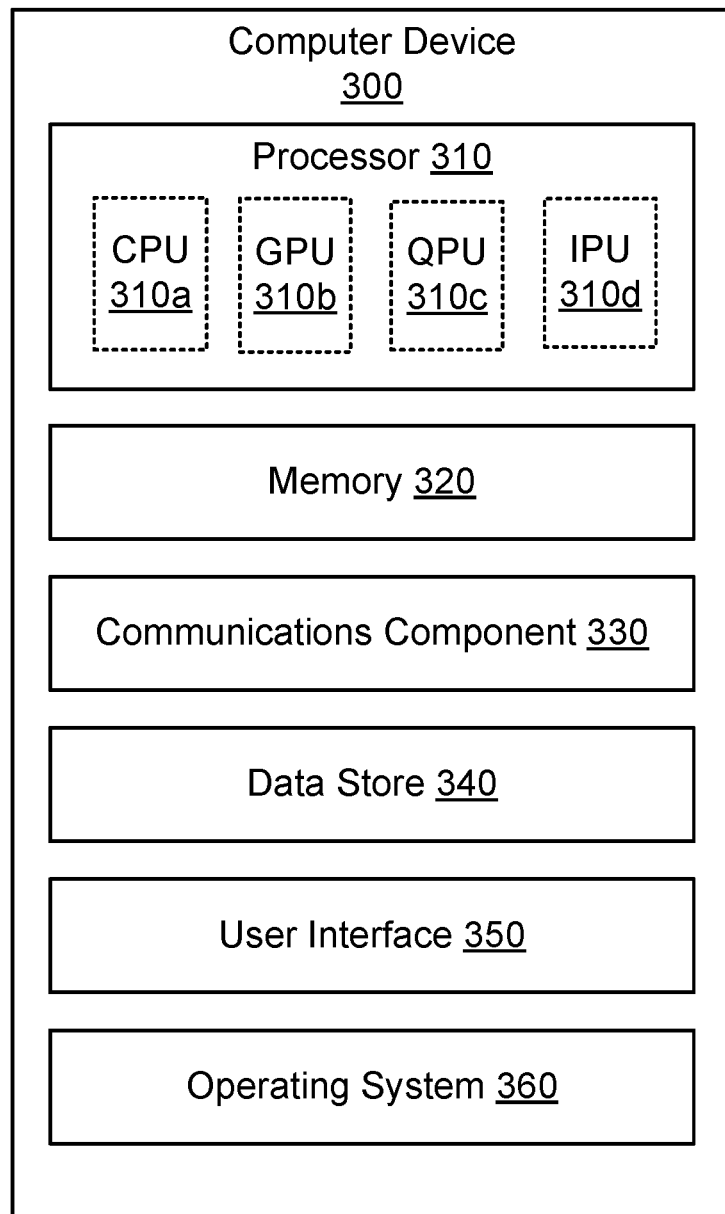
FIG. 3 illustrates an example of a computer device in accordance with aspects of this disclosure.

Referring now to FIG. 3, an example of a computer system or device 300 is illustrated. The computer device 300 can represent a single computing device, multiple computing devices, or a distributed computing system, for example. The computer device 300 can be configured as a quantum computer (e.g., a QIP system), a classical computer, or to perform a combination of quantum and classical computing functions, sometimes referred to as hybrid functions or operations. For example, the computer device 300 can be used to process information using quantum algorithms, classical computer data processing operations, or a combination of both. In some instances, results from one set of operations (e.g., quantum algorithms) are shared with another set of operations (e.g., classical computer data processing). A generic example of the computer device 300 implemented as a QIP system capable of performing quantum computations and simulations is, for example, the QIP system 200 shown in FIG. 2.

The computer device 300 can include a processor 310 for carrying out processing functions associated with one or more of the features described herein. The processor 310 can include a single or multiple set of processors or multi-core processors. Moreover, the processor 310 can be implemented as an integrated processing system and/or a distributed processing system. The processor 310 can include one or more central processing units (CPUs) 310a, one or more graphics processing units (GPUs) 310b, one or more quantum processing units (QPUs) 310c, one or more intelligence processing units (IPUs) 310d (e.g., artificial intelligence or AI processors), or a combination of some or all those types of processors. In one aspect, the processor 310 can refer to a general processor of the computer device 300, which can also include additional processors 310 to perform more specific functions (e.g., including functions to control the operation of the computer device 300).

The computer device 300 can include a memory 320 for storing instructions executable by the processor 310 to carry out operations. The memory 320 can also store data for processing by the processor 310 and/or data resulting from processing by the processor 310. In an implementation, for example, the memory 320 can correspond to a computer-readable storage medium that stores code or instructions to perform one or more functions or operations. Just like the processor 310, the memory 320 can refer to a general memory of the computer device 300, which can also include additional memories 320 to store instructions and/or data for more specific functions.

It is to be understood that the processor 310 and the memory 320 can be used in connection with different operations including but not limited to computations, calculations, simulations, controls, calibrations, system management, and other operations of the computer device 300, including any methods or processes described herein.

Further, the computer device 300 can include a communications component 330 that provides for establishing and maintaining communications with one or more parties utilizing hardware, software, and services. The communications component 330 can also be used to carry communications between components on the computer device 300, as well as between the computer device 300 and external devices, such as devices located across a communications network and/or devices serially or locally connected to computer device 300. For example, the communications component 330 can include one or more buses, and can further include transmit chain components and receive chain components associated with a transmitter and receiver, respectively, operable for interfacing with external devices. The communications component 330 can be used to receive updated information for the operation or functionality of the computer device 300.

Additionally, the computer device 300 can include a data store 340, which can be any suitable combination of hardware and/or software, which provides for mass storage of information, databases, and programs employed in connection with the operation of the computer device 300 and/or any methods or processes described herein. For example, the data store 340 can be a data repository for operating system 360 (e.g., classical OS, or quantum OS, or both). In one implementation, the data store 340 can include the memory 320. In an implementation, the processor 310 can execute the operating system 360 and/or applications or programs, and the memory 320 or the data store 340 can store them.

The computer device 300 can also include a user interface component 350 configured to receive inputs from a user of the computer device 300 and further configured to generate outputs for presentation to the user or to provide to a different system (directly or indirectly). The user interface component 350 can include one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, the user interface component 350 can include one or more output devices, including but not limited to a display, a speaker, a haptic feedback mechanism, a printer, any other mechanism capable of presenting an output to a user, or any combination thereof. In an implementation, the user interface component 350 can transmit and/or receive messages corresponding to the operation of the operating system 360. When the computer device 300 is implemented as part of a cloud-based infrastructure solution, the user interface component 350 can be used to allow a user of the cloud-based infrastructure solution to remotely interact with the computer device 300.

In connection with the systems described in FIGS. 1-3, techniques to generate a double set of individually addressing laser beams for the atomic-based qubits in a quantum computer are described in more detail below.

Figure 4:
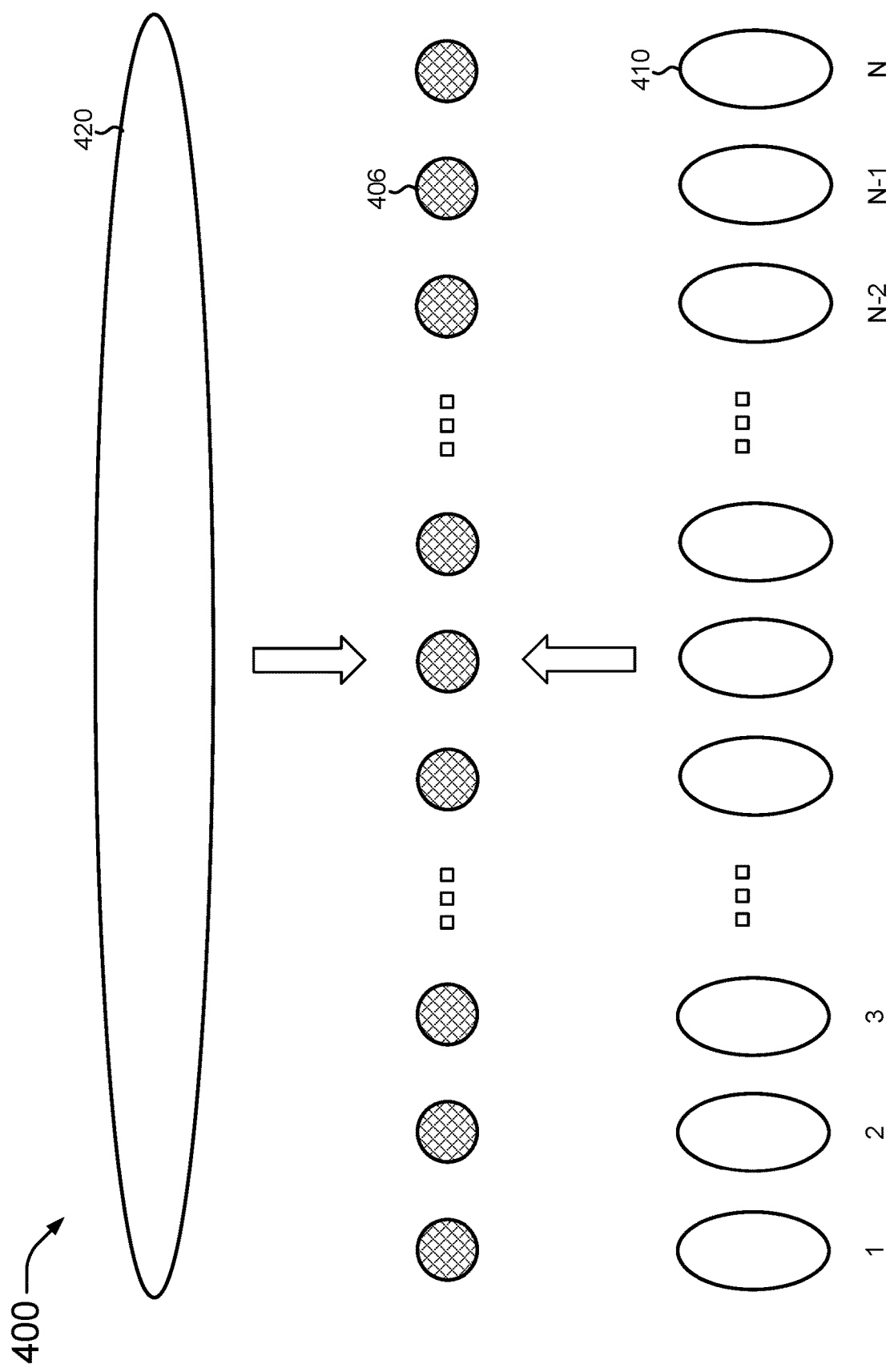
FIG. 4 illustrates an example of a traditional Raman beam geometry in accordance with aspects of this disclosure.

FIG. 4 illustrates a diagram 400 that shows an example of a traditional Raman beam geometry, which can be referred to as an individual-global geometry. A global beam 420 is incident upon an ion chain having multiple ions 406. The global beam 420 is incident from one direction, here from the top towards the ions 406. The global beam 420 is shaped in such a way as to address the entire ion chain (thus the terminology of "global"). That is, the global beam 420 is wide enough to be incident on each of the ions 406 (i.e., the qubits) in the ion chain. To achieve individual addressing, a requirement for universal computation, a set of individual beams 410 that individually address the ions 406 in the ion chain is incident from a direction different from the direction of the global beam 420. In this case, the direction of the individual beams 410 is from the bottom towards the ions 406. These directions (i.e., the direction of the global beam 420 and the direction of the individual beams 410) can be directly opposite directions or can be two different directions that are not exactly opposite each other or colinear.

In the diagram 400, the beams are shown based on the shape and/or size (e.g., laser beam spot shape and/or size) they have when incident on the respective ions 406. For example, N ions 406 are shown for illustration purposes and there are N individual beams 410, each of which has an elliptical shape when incident on its respective ion 406. The global beam 420, however, is elongated along the length of the ion chain to be wide enough to be incident across all of the N ions 406. Thus, the individual beams 410 are shown to be vertically oriented elliptical beams and the global beam 420 is shown to be a horizontally elongated beam.

Figure 5:
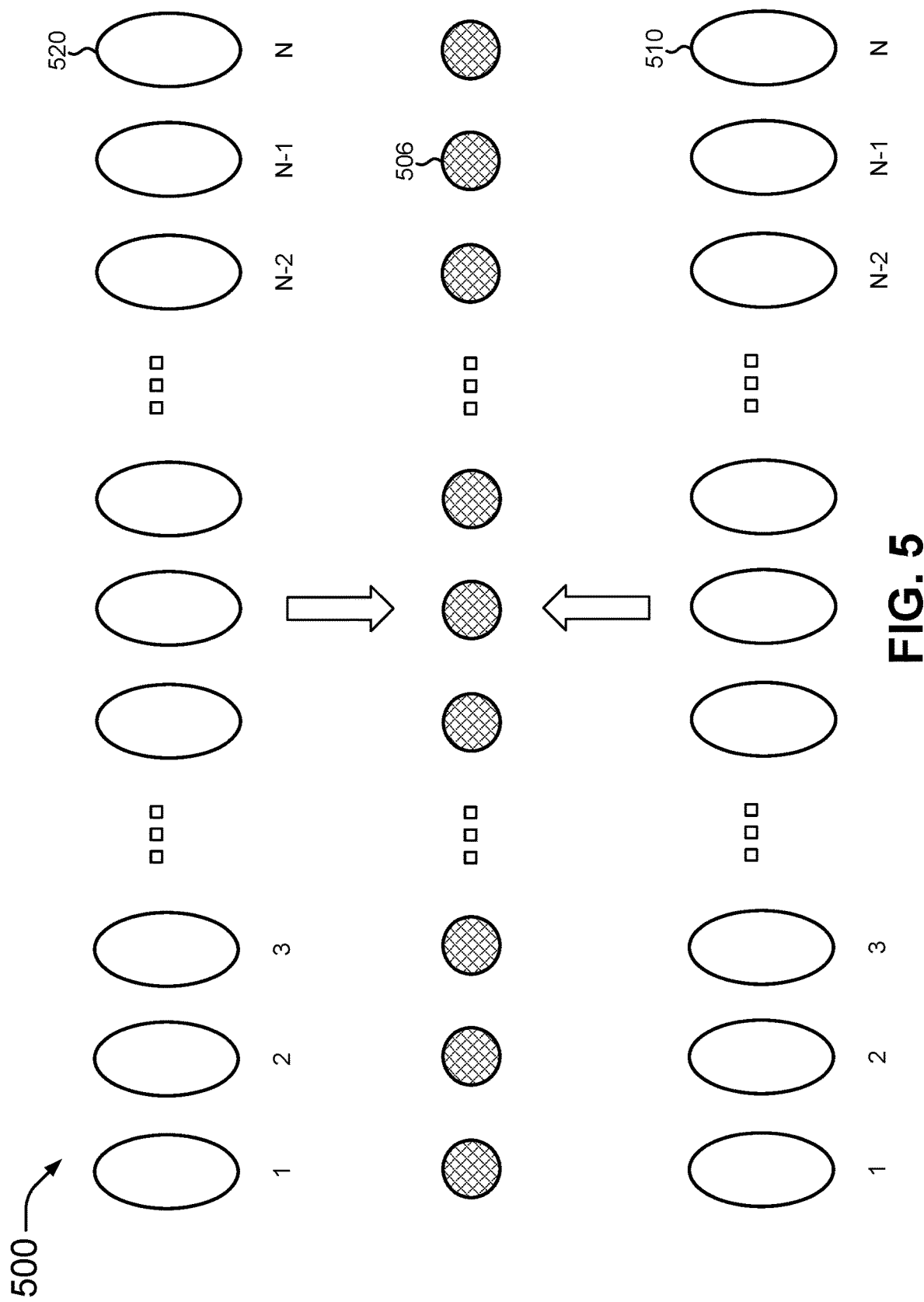
FIG. 5 illustrates an example of double-individual geometry in accordance with aspects of this disclosure.

FIG. 5 illustrates a diagram 500 of an example of double-individual geometry as proposed in this disclosure, where the global beam 420 in FIG. 4 is replaced by a second set of individually addressing beams. In this example, a first set of N individual beams 510 that individually address their respective N ions 506 (i.e., the qubits) in the ion chain is incident from one direction, which in this case is from the bottom towards the ions 506. A second set of N individual beams 520 that individually address their respective N ions 506 in the ion chain is incident from another direction, which in this case is from the top towards the ions 506. These directions (i.e., the direction of the individual beams 510 and the direction of the individual beams 520) can be directly opposite directions or can be two different directions that are not exactly opposite each other or colinear.

The individual beams 510 and the individual beams 520 are shown to have an elliptical shape (e.g., laser beam spot shape) because that is their shape when incident on its respective ion 506.

As noted above, the individual addressing beams shown in FIGS. 4 and 5 can be elliptical optical beams, that is, the laser beam spot shape has an elliptical shape. Other types of optical beams, such as circular beams, may also be used. Therefore, whichever QIP system is used to implement the types of geometries described in connection with FIGS. 4 and 5 needs to be configured to handle elliptical optical beams.

As described above, there are several advantages to the geometry shown in FIG. 5. Some of these advantages and techniques for implementing these advantages will be described in more detail below in connections with FIGS. 6-15.

Figure 6:
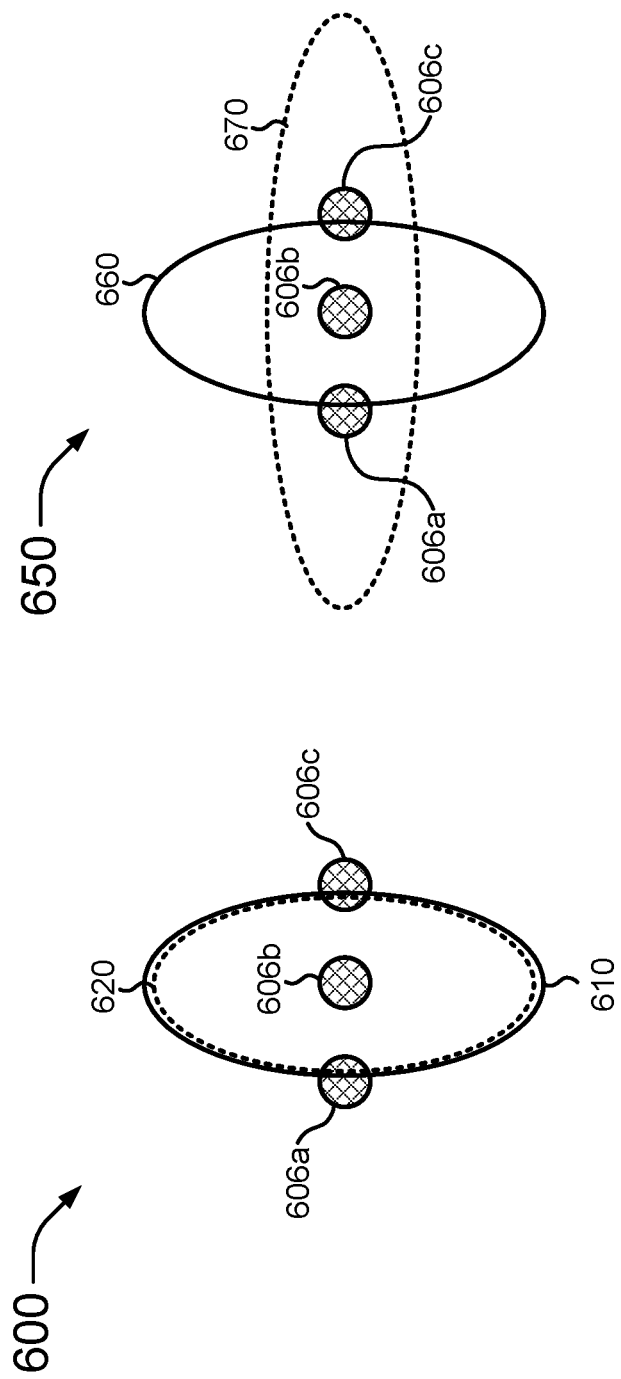
FIG. 6 illustrates examples of crosstalk differences in accordance with aspects of this disclosure.

FIG. 6 illustrates diagrams 600 and 650 that show examples of crosstalk differences for different geometries. The diagram 600 (left side of the figure) shows the case for double-individual geometry (see e.g., FIG. 5) and the diagram 650 (the right side of the figure) shows the case for the individual-global geometry (see e.g., FIG. 4), where the double-individual geometry reduces qubit crosstalk when compared to the individual-global geometry.

In each of the diagrams in FIG. 6, it is the center ion that is being addressed by individual beams. Crosstalk is proportional to the laser beam intensity that is incident upon ions that are not being addressed by the individual beams, which in this case are the ions to the left and to the right of the center ions. In other words, if the laser intensity of the laser beams, both individual and global, intended for the center ions overlaps with adjacent ions to the left and/or to the right of the center ions, then the adjacent ions can receive an unintended amount of laser intensity (crosstalk) from the individual and global beams when addressing the center ions.

The diagram 600 in FIG. 6 shows an example of the double-individual geometry, with one individual beam 610 (solid line) incident on a center ion 606*b* from one direction (e.g., from the back of the figure) and another individual beam 620 (dashed line) incident on the center ion 606*b* from another direction (e.g., from the front of the figure). In this example the individual beams 610 and 620 are elliptical optical beams with substantially the same orientation (e.g., vertical orientation), shape, and size, and are only shown to be slightly different to be able to identify them from each other in the diagram. The individual beams 610 and 620 are intended to substantially overlap (e.g., have substantially the same orientation, shape, and size) at the point at which they are both incident on the center ion 606*b*. Because of this geometry, only a small amount of the laser intensity from both beams is incident on the neighboring ions (e.g., a left ion 606*a* and a right ion 606*c*). That is, only a small portion of the beams used to individually address the center ion 606*b* overlaps with the left ion 606*a* and the right ion 606*c* and thus crosstalk in those adjacent ions resulting from addressing the center ion is reduced or minimized.

The diagram 650 in FIG. 6 shows the traditional individual-global geometry, with one individual beam 660 (solid line) incident on the center ion 606*b* from one direction (e.g., from the back of the figure) and a global beam 670 (dashed line) incident on the center ion 606*b* from another direction (e.g., from the front of the figure). In this example, the individual beam 660 and the global beam 670 do not have the substantially the same orientation, shape, and size. For example, the individual beam 660 is shown to be vertically oriented and the global beam 670, which as described above is elongated along the ion chain, is shown to have a different orientation. The individual beam 660 can be an elliptical optical beam. Because of this geometry, although only a small amount of laser intensity from the individual beam 660 is incident in the neighboring ions (e.g., the left ion 606*a* and the right ion 606*c*), as shown by the small overlap, the full intensity of the global beam 670 is incident on the neighboring ions, which results in a the global beam 670 overlapping the left ion 606*a* and the right ion 606*c* and thus crosstalk tends to be larger than in the individual-global geometry than in the double-individual geometry.

Figure 7:
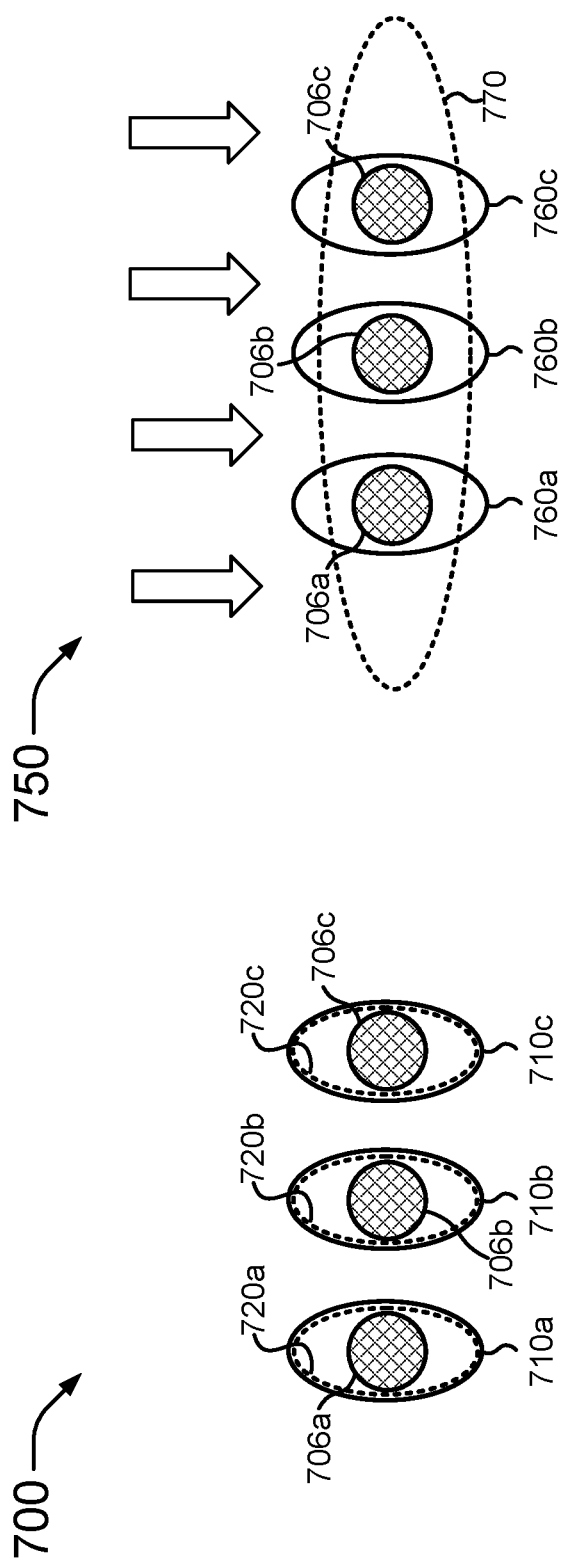
FIG. 7 illustrates examples of power efficiency differences in accordance with aspects of this disclosure.

FIG. 7 illustrates diagrams 700 and 750 that show examples of power efficiency differences for different geometries. The diagram 700 (e.g., the left side of the figure) shows the case for double-individual geometry and the diagram 750 (e.g., the right side of the figure) shows the case for the individual-global geometry, where the double-individual geometry is more efficient and, therefore, more scalable.

In the diagram 700 in FIG. 7, individual beams 710*a*, 710*b*, and 710*c* (solid lines) are respectively incident on ions 706*a*, 706*b*, and 706*c* from one direction (e.g., from the back of the figure), and individual beams 720*a*, 720*b*, and 720*c* (dashed lines) are respectively incident on the ions 706*a*, 706*b*, and 706*c* from another direction (e.g., from the front of the figure). In this example, the individual beams 710*a*, 710*b*, and 710*c* and their corresponding individual beams 720*a*, 720*b*, and 720*c* are elliptical optical beams with substantially the same orientation (e.g., vertical orientation), shape, and size, and are only shown to be slightly different to be able to identify them from each other in the diagram. The individual beams 710*a*, 710*b*, and 710*c* and their corresponding individual beams 720a, 720b, and 720c are intended to substantially overlap (e.g., have substantially the same orientation, shape, and size) at the point at which they are incident on their respective ions 706a, 706b, and 706c. The double-individual geometry illustrated in the diagram 700 enables beam shaping, which can provide optimal laser power delivery to the appropriate ion locations without the power being wasted between the ions or by it being applied to the wrong ions.

In the diagram 750 in FIG. 7, individual beams 760a, 760b, and 760c (solid lines) are respectively incident on ions 706a, 706b, and 706c from one direction (e.g., from the back of the figure), and a global beam 770 (dashed line) is incident on all the ions 706a, 706b, and 706c from another direction (e.g., from the front of the figure). In this example, the individual beams 760a, 760b, and 760c have substantially the same orientation (e.g., vertical orientation), shape and size. The global beam 770, however, is elongated along the ion chain, and is shown to have a different orientation, shape, and size than the individual beams. In the diagram 750, the arrows indicate wasted power that is delivered to the vacuum space between ions in the chain.

In an example to illustrate power efficiency differences, when the individual beams have a beam diameter is 1.5 mm and the ion spacing is 4.5 mm, the overhead on the individual-global geometry is 100%. Thus, typically the individual-global geometry may tend to be less efficient than the double-individual geometry because less of the power is wasted. However, there may be instances in which additional losses resulting from generating the additional set of individual beams in the double-individual geometry may be such that the individual-global geometry may be more power efficient.

Figure 8:
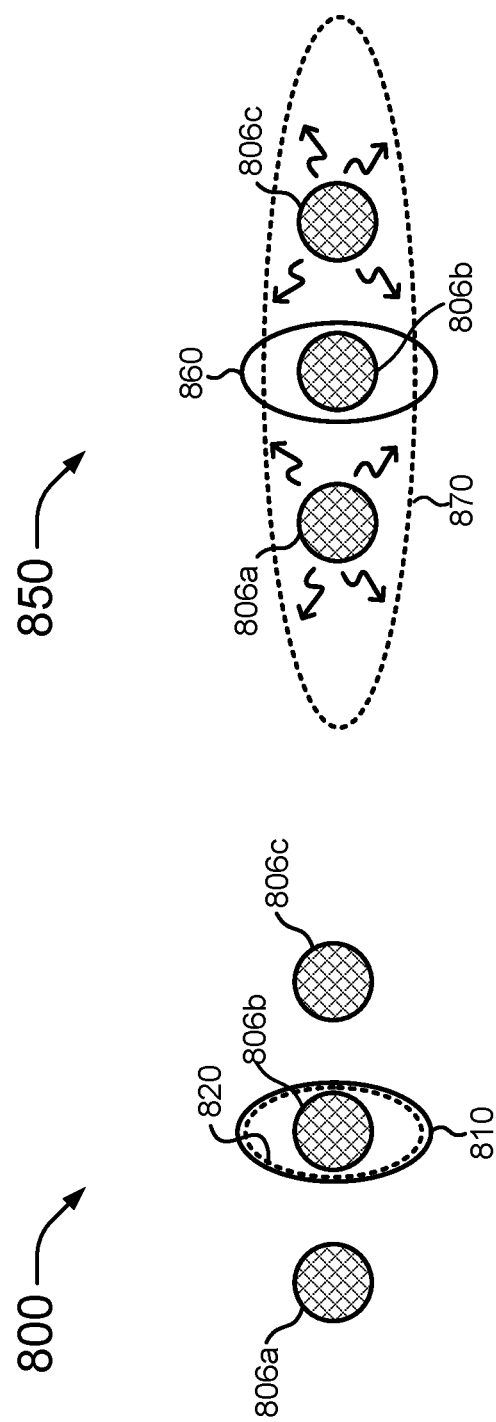
FIG. 8 illustrates examples of differences in spontaneous emission and idle errors in accordance with aspects of this disclosure.

FIG. 8 illustrates diagrams 800 and 850 that show examples of differences in spontaneous emission and idle errors for different geometries. The diagram 800 (e.g., the left side of the figure) shows the case for double-individual geometry and the diagram 850 (e.g., the right side of the figure) shows the case for the individual-global geometry.

In the diagram 800 in FIG. 8, there are shown ions 806a, 806b, and 806c. The center ion, ion 806b, is addressed with an individual beam 810 (solid line) from one direction (e.g., from the back of the figure), and an individual beam 820 (dashed line) from another direction (e.g., from the front of the figure). In this example, the individual beams 810 and 820 are elliptical optical beams with substantially the same orientation (e.g., vertical orientation), shape, and size, and are only shown to be slightly different to be able to identify them from each other in the diagram. The neighboring ions, the left ion 806a and the right ion 806c, are not addressed with individual beams.

In the diagram 850 in FIG. 8, there are also shown the ions 806a, 806b, and 806c, with the center ion 806b being addressed by an individual beam 860 (solid line) from one direction and all the ions having a global beam 870 incident on them from another direction. The individual beam 860 is an elliptical optical beam and the global beam 870 is elongated along the ion chain, and is shown to have a different orientation, shape, and size than the individual beam 860.

Using the double-individual geometry in the diagram 800 allows for beam shaping to be implemented to help to minimize light incident on the neighboring ions. Thus, the double-individual geometry can reduce the effects of fundamental limits on a Raman addressing system.

The individual-global geometry in the diagram 850 is where the full intensity of the global beam 870 is incident upon all ions in the chain for all Raman operations. This unwanted intensity can lead to what are known as idle errors, or errors in qubits when ostensibly no operations are being applied to them, which include unwanted shifts and spontaneous emission, which limits quantum computing fidelity and performance. In this example, spontaneous emission is indicated by black arrows representing photons being scattered by the neighboring ions (which represent all ions in the chain). Since this error scales with the number of ions in the chain (e.g., the size of the quantum computer), this error is made worse as the system scales.

The double-individual geometry in the diagram 800 also allows for optimizing the spontaneous emission from a target qubit by balancing the intensity on both sides, which optimizes the Rabi rate (interaction strength) per unit of spontaneous emission.

Figure 9:
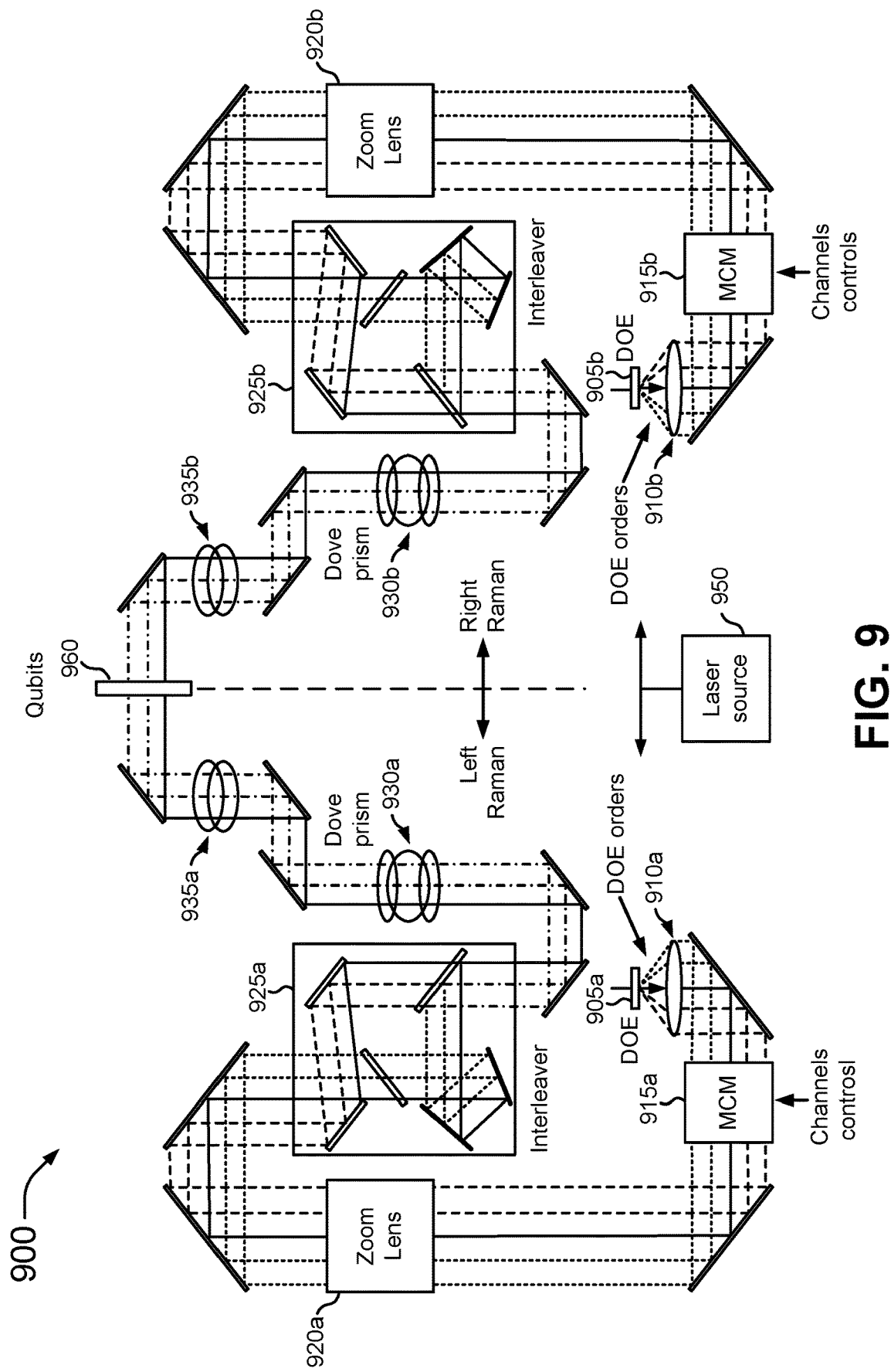
FIG. 9 illustrates an example of a schematic of a Raman system that provides a double-individual addressing scheme in accordance with aspects of this disclosure.

FIG. 9 illustrates a diagram 500 that shows an example of a double-individual Raman system schematic. This implementation is for illustration purposes and some variations are possible within the scope of this disclosure.

The double-individual Rama system includes two symmetrical portions or parts, a left Raman (left half of the diagram 900) and a right Raman (right half of the diagram 900). Because the left and right halves of the system in the diagram 900 are symmetric, the operations and configurations of the two halves of the double-individual Raman system are substantially the same.

A laser source 950 generates a laser beam that is split so that it can be provided as input to both the left Raman and the right Raman. For the left Raman, the input laser beam is provided to a diffractive optical element (DOE) 905a that generates an array of individual laser beams. The number of beams generated by the DOE 905a is based on the number of orders supported by the DOE (i.e., the DOE orders) and needs to be sufficient to allow for individual addressing of qubits 960 (e.g., an array of ions in an ion chain as described in FIG. 1). In some instances, the DOE 905a may generate more beams than the number of individual laser beams needed by the left Raman. The array of individual laser beams is provided to a multi-channel modulator (MCM) 915a after passing through an optical system 910a that allows for the spacing between the individual laser beams to match the spacing of the channels in the MCM 915a. In an example, the MCM 915a may be an acousto-optic modulator (AOM) or an electro-optic modulator (EOM) and may have a sufficient number of channels to separately control each of the individual laser beams. As shown in the diagram 900, the MCM 915a receives channel signals (e.g., channel controls) to separately control each of the individual laser beams, including signals for controlling the amplitude, phase, frequency, and/or polarization of each individual laser beam.

After the MCM 915a, the array of individual laser beams is sent through the remaining portion of the left Raman consisting of lenses, mirrors, and a number of beam shaping or beam configuration devices. For example, the array of individual laser beams passes through a double-telecentric zoom lens simply referred to as a telecentric zoom lens or zoom lens 920a, an interleaver 925a, a dove prism 930a, and another set of lenses, mirrors, and beam shaping devices or beam configuration 935a. At the end, the array of individual laser beams is imaged onto the qubits 960. When the qubits comprise a chain of ions or other atomic-based qubits, the imaging of the array of individual laser beams is as shown in FIG. 5, for example.

The left Raman is such that the MCM 915a, the zoom lens 920a, and the interleaver 925a, along with one or more optical components, form a first or left optical path of the overall Raman system. These components are configured to receive the array of individual laser beams (e.g., from the DOE 905a) and to adjust and/or configure the array of individual laser beams such that each beam in the array is used to individually address a respective qubit in the qubits 960 (e.g., a respective ion in an ion chain).

The right Raman includes, in addition to mirrors and lenses, a DOE 905b, an optical system 910b, an MCM 915b, a zoom lens 920b, an interleaver 925b, a dove prism 930b, and another set of lenses, mirrors, and beam shaping or beam configuration devices 935b. As noted above, the right Raman and the left Raman are symmetrical and their operations and configurations are substantially the same. Accordingly, corresponding components or elements from both halves also have substantially the same operations and configurations.

The right Raman is such that the MCM 915b, the zoom lens 920b, and the interleaver 925b, along with one or more optical components, form a second or right optical path of the overall Raman system. These components are configured to receive the array of individual laser beams (e.g., from the DOE 905b) and to adjust and/or configure the array of individual laser beams such that each beam in the array is used to individually address a respective qubit in the qubits 960 (e.g., a respective ion in an ion chain). The array of individual laser beams provided by the left Raman is imaged onto the qubits 960 in one direction and the array of individual laser beams provided by the right Raman is imaged onto the qubits 960 in another direction. For example, the two directions can be opposite directions but need not be so limited.

Some parts of the Raman system can be generated or implemented in multiple ways. For example, the combination of a DOE and MCM can be produced by using instead individual fiber coupled modulators that are then combined into a fiber array. The output of the fiber array is then used as the source of the array of individual laser beams and would be the input into the zoom lens.

As noted above, the left Raman and the right Raman of the double-individual Raman system need to generate arrays of individual beams which that are well matched in spacing, telecentricity, polarization, and spatial profile at the ion plane. Because there is a need to match three spacings, the two sets of individual Raman beams and the ion chain, small imperfections in the optical system magnification can no longer be taken up by the ion chain alone (as is the case with a global Raman beam).

Accordingly, to handle the additional degrees of freedom (DOFs) needed to accomplish such a matching, this disclosure proposes the use devices that allow for different types of beam manipulations. One such device is a reflective dove prism, or simply referred to as a dove prism, examples of which are the dove prisms 930a and 930b. Details regarding the dove prism are provided below and in, for example, U.S. Pat. No. 11,322,343 titled "Optical Alignment Using Reflective Dove Prisms" and issued on May 3, 2022, the contents of which are incorporated herein by reference. Another such device is a telecentric zoom lens, or simply a zoom lens, examples of which are the zoom lens 920a and the zoom lens 920b.

Figure 10A:
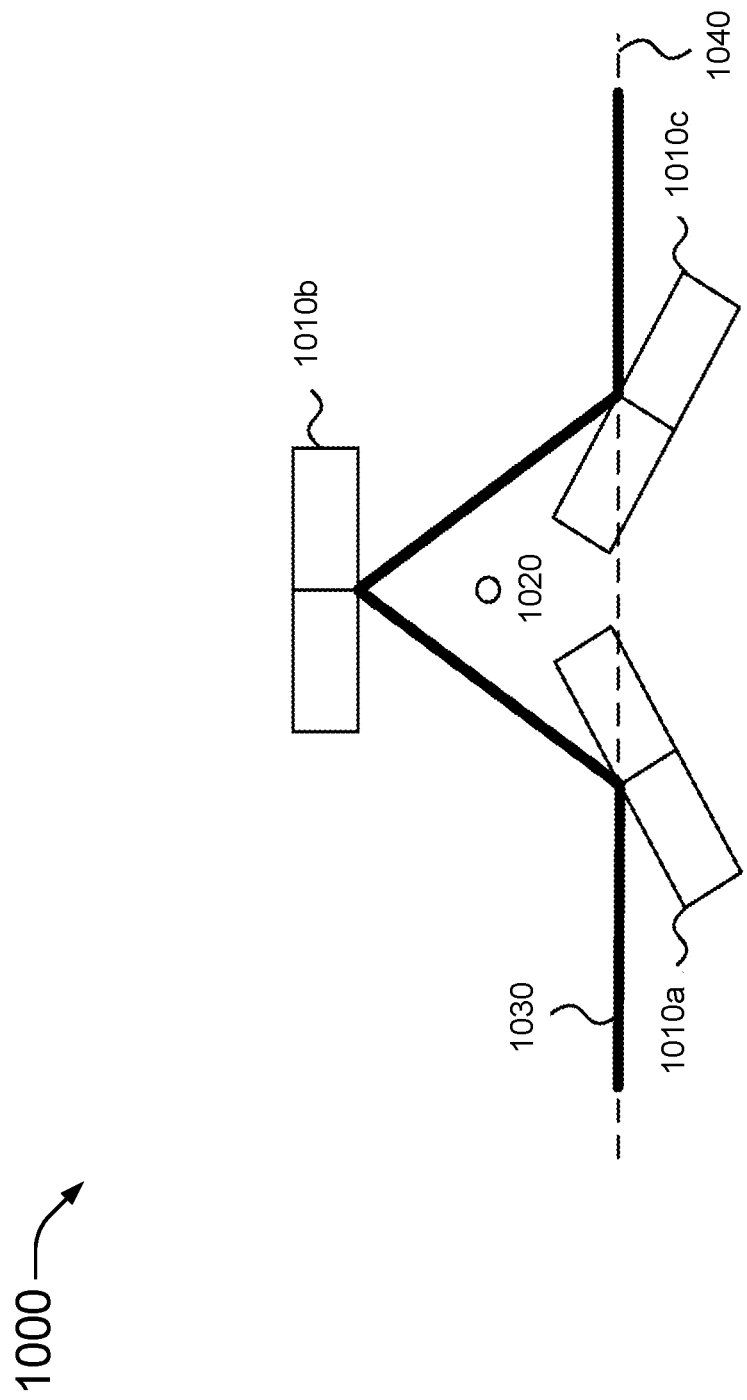
FIGS. 10A and 10B illustrate examples of a reflective dove prism in accordance with aspects of this disclosure.
Figure 10B:
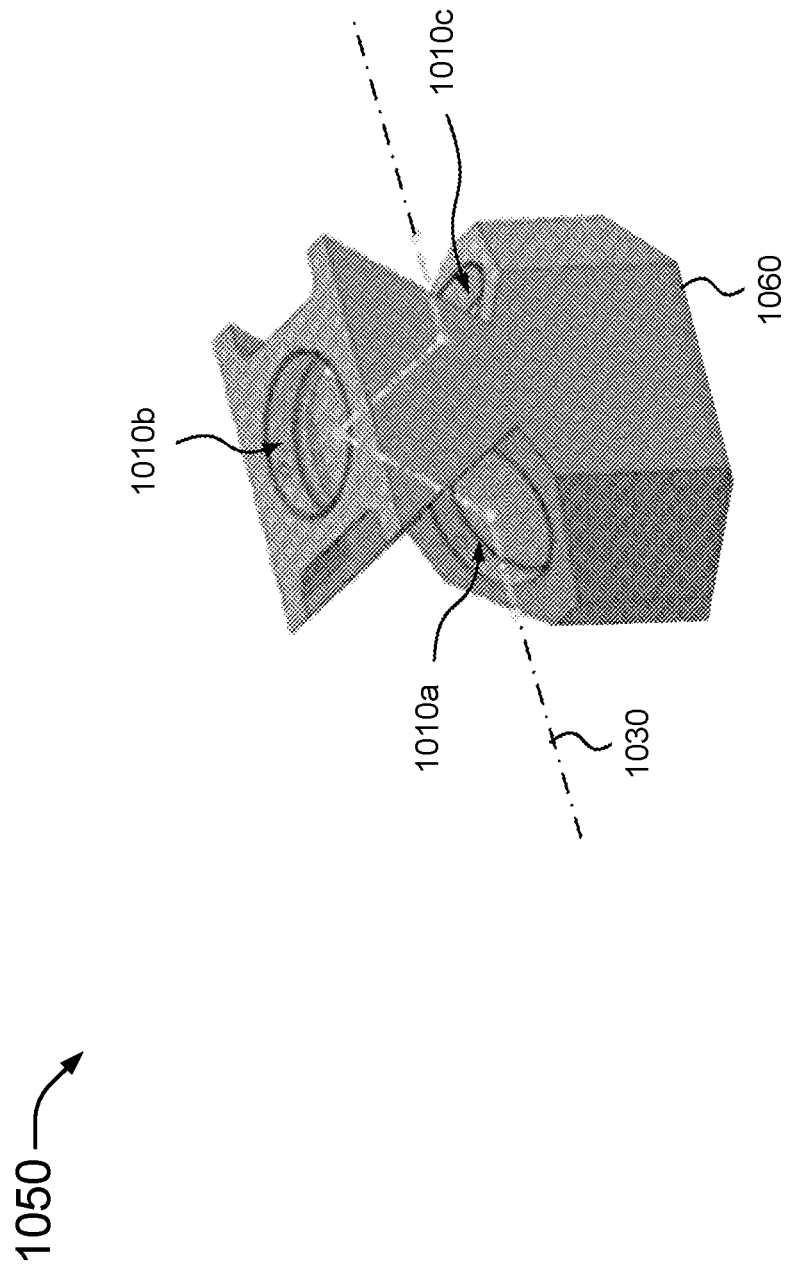

FIGS. 10A and 10B illustrate examples of a reflective dove prism, which provides the roll degree-of-freedom for the array or fan of individual beams. FIG. 10A shows a diagram 1000 that illustrates an example of reflective elements or structures (e.g., mirrors) to reproduce the functionality of a dove prism (e.g., the dove prisms 930a and 930b).

In contrast to refractive optics, the use of reflective optics involves a change in direction of light at an interface between two different media so that the light returns into the medium from which it originated. In reflective optics the light need not enter the second medium for it to change its trajectory.

In the example in the diagram 1000, an input beam 1030 (or input image) is directed to a first reflective structure 1010a, is reflected from the first reflected structure 1010a towards a second reflective element 1010b, where it is again reflected towards a third reflective structure 1010c, where it once again is reflected in a direction of a propagation axis 1040 of the original input beam 1030. The first reflective structure 1010a and the third reflective structure 1010c are angled with the same tilt respect the propagation axis 1040. The second reflective structure 1010b is essentially used to retro reflect the input beam 1030 onto a third dimension to create the effect of a periscope. When the arrangement of the reflecting structures is rotated respect a centered pivot point 1020, the input beam 1030 is tilted by twice the rotation angle of the overall assembly. The rotation angle can be small, for example, the rotation angle can be less than 1 degree (1.degree.). The rotation angle can be in a positive direction (e.g., in one direction) or a negative direction (e.g., in the opposite direction), and can range as high as 90 degrees (90.degree.) in either direction. The rotation angle can be controlled with accuracy of, for example, a tenth of a degree (0.1.degree.) or better.

Now referring to FIG. 10B, a diagram 1050 is shown that illustrates a perspective view of a system or assembly with a housing 1060 for setting or positioning the reflecting structures 1010a, 1010b, and 1010c in the diagram 1000 of FIG. 10A. The input beam 1030 (or input image) is directed toward a first reflective structure 1010a. For example, the housing 1060 may have a lower portion in which the first reflective structure 1010a and the third reflective structure 1010c are set at the right tilt or angle, and an upper portion in which the second reflective structure 1010b is set. The reflecting structures being separate but embedded into the housing 1060 may be made of different materials than a material used for making the housing 1060. The housing 1060 is also configured to provide a free path for the reflections to take place. It is to be understood that the housing 1060 is provided by way of illustration and many different configurations, shapes, or form factors may be used to provide the same or similar functionality to that of the housing 1060.

Figure 11:
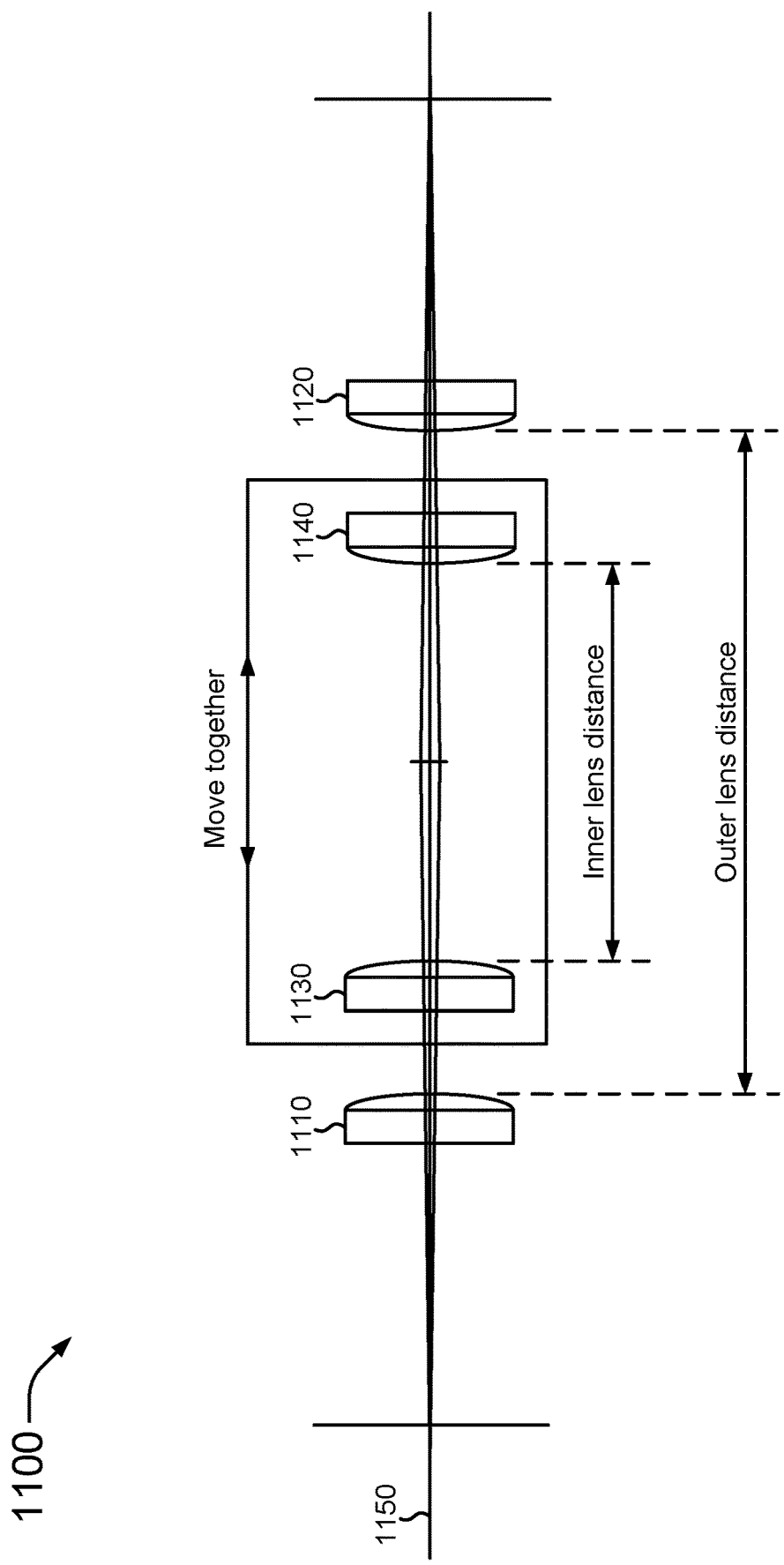
FIG. 11 illustrates an example schematic of a simplified telecentric zoom lens for a double-individual system in accordance with aspects of this disclosure.

FIG. 11 illustrates a diagram 1100 that shows a possible implementation of a simplified telecentric zoom lens schematic for use in a double-individual geometry. Examples of such a telecentric zoom lens are the zoom lens 920a and the zoom lens 920b in FIG. 9. By using a telecentric zoom lens, the appropriate spacing degree-of-freedom that is needed for the double-individual geometry can be implemented.

The telecentric zoom lens includes two sets of lenses. An outer set of two lenses, lenses 1110 and 1120. The lenses 1110 and 1120 are fixed, that is, they are not configured to move or slide along the optical axis 1150. The outer lens distance between the two outer lenses is therefore fixed.

Also, part of the telecentric zoom lens is an inner set of two lenses, lenses 1130 and 1140. The inner lenses 1130 and 1140 are configured to move together, that is, they are configured to move or slide together along the optical axis 1150. The inner lens distance between the two inner lenses is also fixed. In a different implementation, the inner lenses 1130 and 1140 are configured to be fixed and the outer lenses 1110 and 1120 are configured to move together.

In an aspect, each of the lenses in the outer set of two lenses may be implemented using a single lens and each of the lenses in the inner set of the two lenses may be implemented using a compound lens. Other implementations of the lenses in the inner set and the outer set may also be used. For example, any one of the lenses in the inner set or in the outer set may be a single lens or a compound lens as the system demands it.

Figure 12:
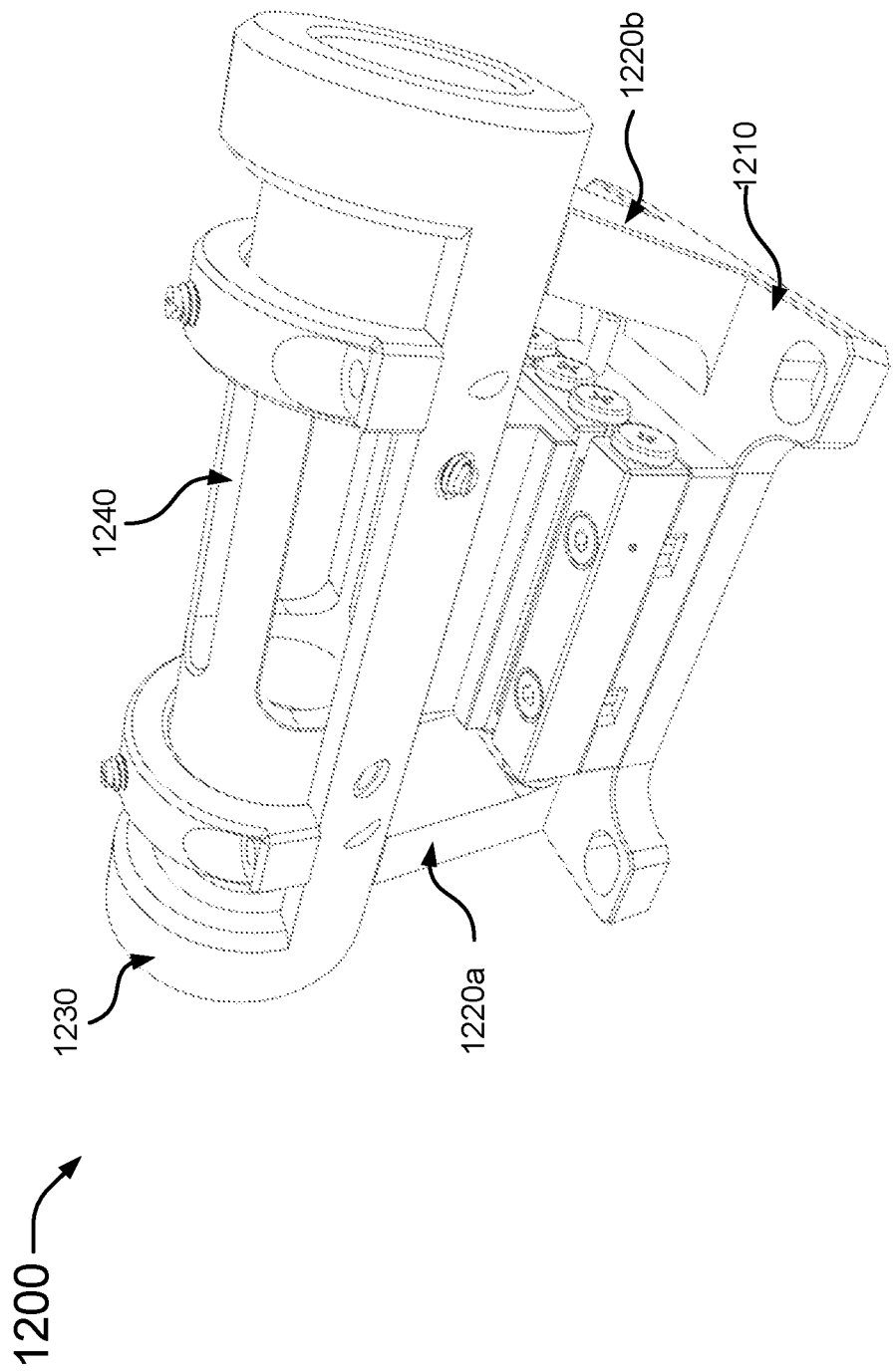
FIG. 12 illustrates a mechanical implementation of the simplified telecentric zoom lens in accordance with aspects of this disclosure.

FIG. 12 illustrates a diagram 1200 that shows an isometric view of a mechanical implementation of the simplified telecentric zoom lens in FIG. 11. The telecentric zoom lens includes a base 1210, a housing 1230 attached to the base 1210 and holds the outer pair of lenses (e.g., lenses 1110 and 1120 in FIG. 11) in the fixed position, and a movable portion or carriage 1240 that slides along the housing 1230 and holds the inner pair of lenses (e.g., lenses 1130 and 1140 in FIG. 11). The slide of the carriage 1240 is a linear slide that may be manual or motorized. The outer two lenses are held together by the housing 1230 and are referenced to the rest of the optical system (e.g., the respective Raman system in FIG. 9).

In another implementation of the simplified telecentric zoom lens, the inner pair of lenses may be of fixed position and the outer pair of lenses is configured to move together.

One of the challenges of using the double-individual geometry described herein is the increased sensitivity to pointing noise of the beams (e.g., noise or fluctuations in the beam pointing direction). The global beam geometry is such that it is insensitive to pointing due to the large size of the global optical beam relative to the atomic-based qubits. Only the individual beams meaningfully suffer from pointing noise (global beam impact is negligible), thus having a double-individual geometry increases this by a factor of 2, which has the effect of a factor of $\sqrt{2}$ on qubit operations. One way to reduce this problem is to increase the spot size of the individual beams. This is a fundamental tradeoff with crosstalk, and an optimal value may be chosen as a fraction of the ion spacing, for instance. However, the traditional MCM configuration is limited by a different factor: the size of the beam inside the MCM device as a fraction of the channel spacing, which is then reimaged onto the ion chain.

The MCM device parameters (e.g., AOM device parameters), namely the MCM channel spacing and the Gaussian beam size the MCM is designed to handle, set the beam array properties at the ion chain because, with a traditional imaging system, the Gaussian and geometric beam properties are tied together (known as the optical invariant or etendue). As an example, an MCM device that has a channel spacing of 450 mm and a designed Gaussian beam size of 75 µm has a spacing-to-size ratio of 6. A typical ion chain spacing is 4.5 µm, which means that the output beam array optics of the Raman system need to demagnify the MCM spacing by 100× (i.e., from 450 mm to 4.5 mm) to reimage the optical beams onto the ion chain. This means that the optical beam size, for an ion chain spacing of 4.5 µm, is 0.75 µm (i.e., a 100× demagnifying from 75 µm). An example of a more favorable ratio for an ion chain separation to an ion chain beam size is 3, or, in the example given above, the exemplary beam size is approximately 1.5 µm for an ion chain separation of 4.5 µm.

Figure 13A:
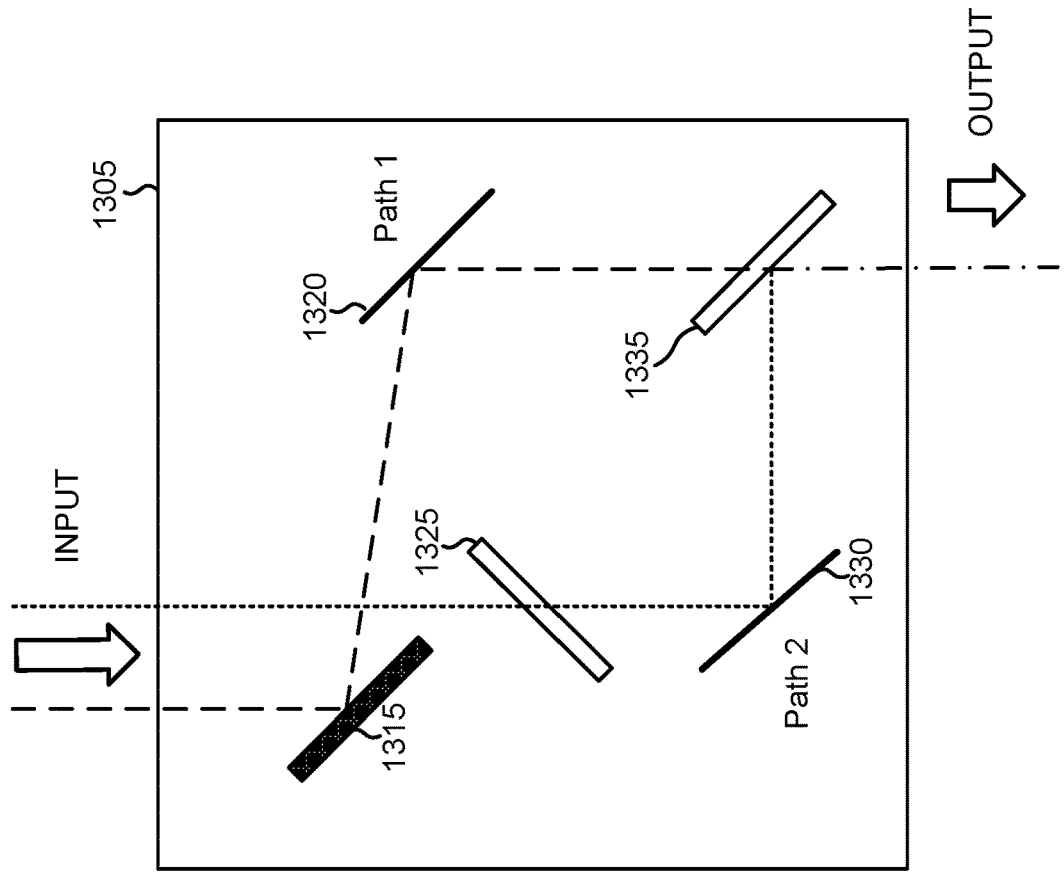
FIGS. 13A and 13B illustrate examples of a simplified view of an interleaver functionality in accordance with aspects of this disclosure.

The necessary factor (e.g., factor of 2) can be achieved using an interleaver, shown in FIGS. 13A, 13B, and 14 below. FIG. 13A shows a diagram 1300 that illustrates an example of a simplified view of the interleaver functionality. Here, an input array of optical beams is split into two, a left half of the optical beams represented by a dashed line and a right half of the optical beams represented by a dotted line, which are then recombined into an output array of optical beams with an interferometer-like setup 1305 having matching path lengths on each of the legs or paths. It is important to note that is necessary in setups that use pulsed lasers and may not be a requirement for other setups, such setups that use continuous wave (CW) Raman lasers. In this example, the left half of the optical beams passes through a first path (Path 1) that includes optical elements 1315, 1320, and 1335. The right half of the optical beams passes through a second path (Path 2) that includes optical elements 1325, 1330, and 1335. This effectively shifts the left side to overlap with the right side in an interdigitated geometry. This leaves the Gaussian beam properties unchanged and reduces the beam array spacing by the appropriate factor.

Figure 13B:
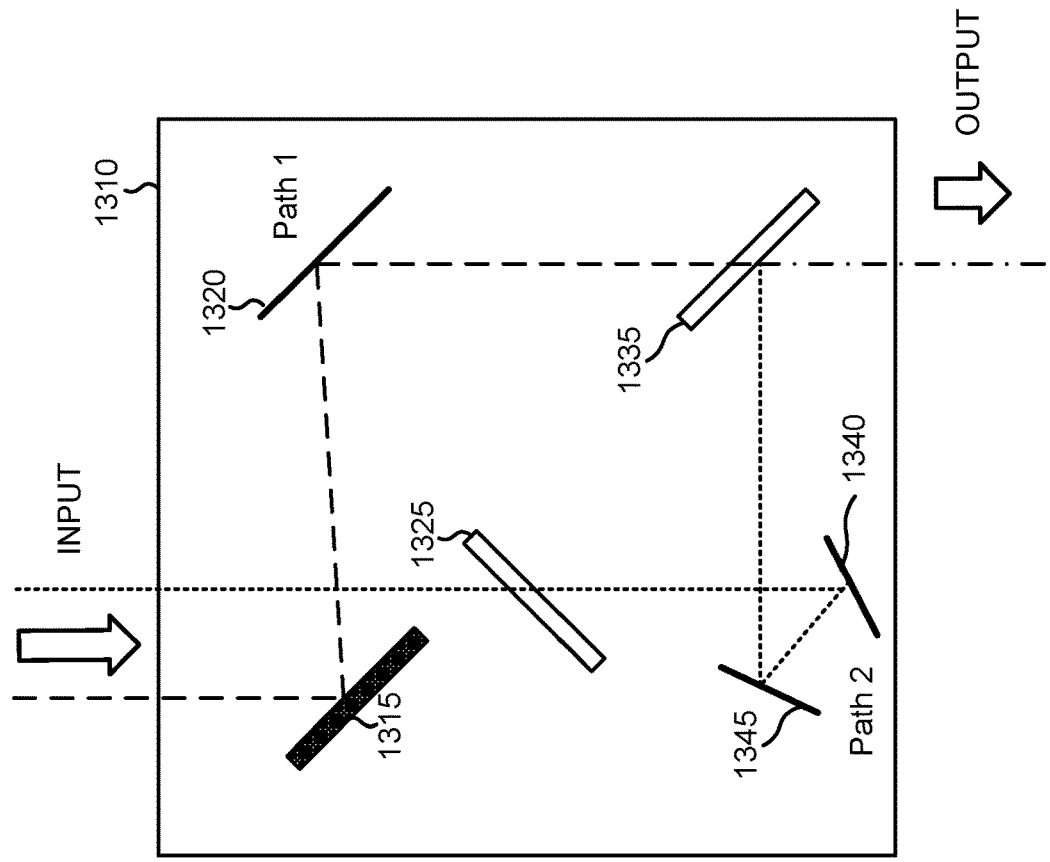

A similar functionality to that provided by the interleaver in the diagram 1300 in FIG. 13A can be achieved with an interleaver configuration that has extra mirror, an example of which is shown in a diagram 1350 in FIG. 13B. Here again an input array of optical beams is split into two, a left half of the optical beams represented by a dashed line and a right half of the optical beams represented by a dotted line, which are then recombined into an output array of optical beams with an interferometer-like setup 1310 having matching path lengths on each of the legs or paths. In this example, the left half of the optical beams passes through a first path (Path 1) that includes optical elements 1315, 1320, and 1335. The right half of the optical beams passes through a second path (Path 2) that includes optical elements 1325, 1340, 1345, and 1335. This effectively flips the left side to overlap with the right side in an interdigitated geometry. This leaves the Gaussian beam properties unchanged and reduces the beam array spacing by the appropriate factor.

Figure 14:
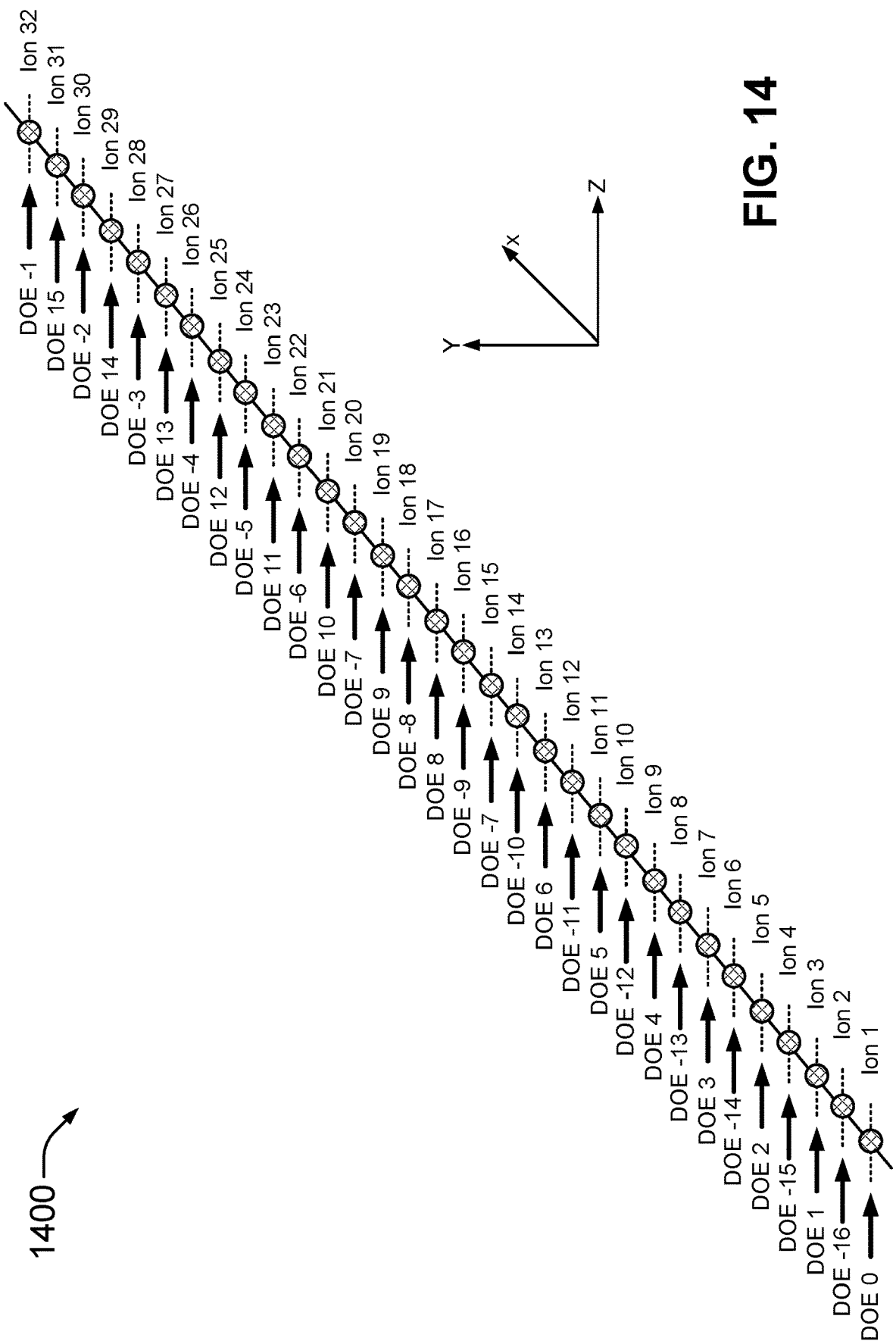
FIG. 14 illustrates an example of the beam and ion numbering after the interleaver in accordance with aspects of this disclosure.

FIG. 14 illustrates a diagram 1400 that shows an example of the numbering of the individual laser/optical beams being applied from one side of the Raman system and respective ions after the interleaving process is performed by one of the interleavers described herein or some other interleaver configuration. In this example, the ions in the ion chain are numbered 1-32 and the laser/optical beams are labeled to indicate their DOE order –16-0. As noted above, the diagram 1400 only shows optical beams from one side of the Raman system as they are imaged on the ions/qubits, with a similar set of optical beams being imaged from the other side of the Raman system but not shown.

Figure 15:
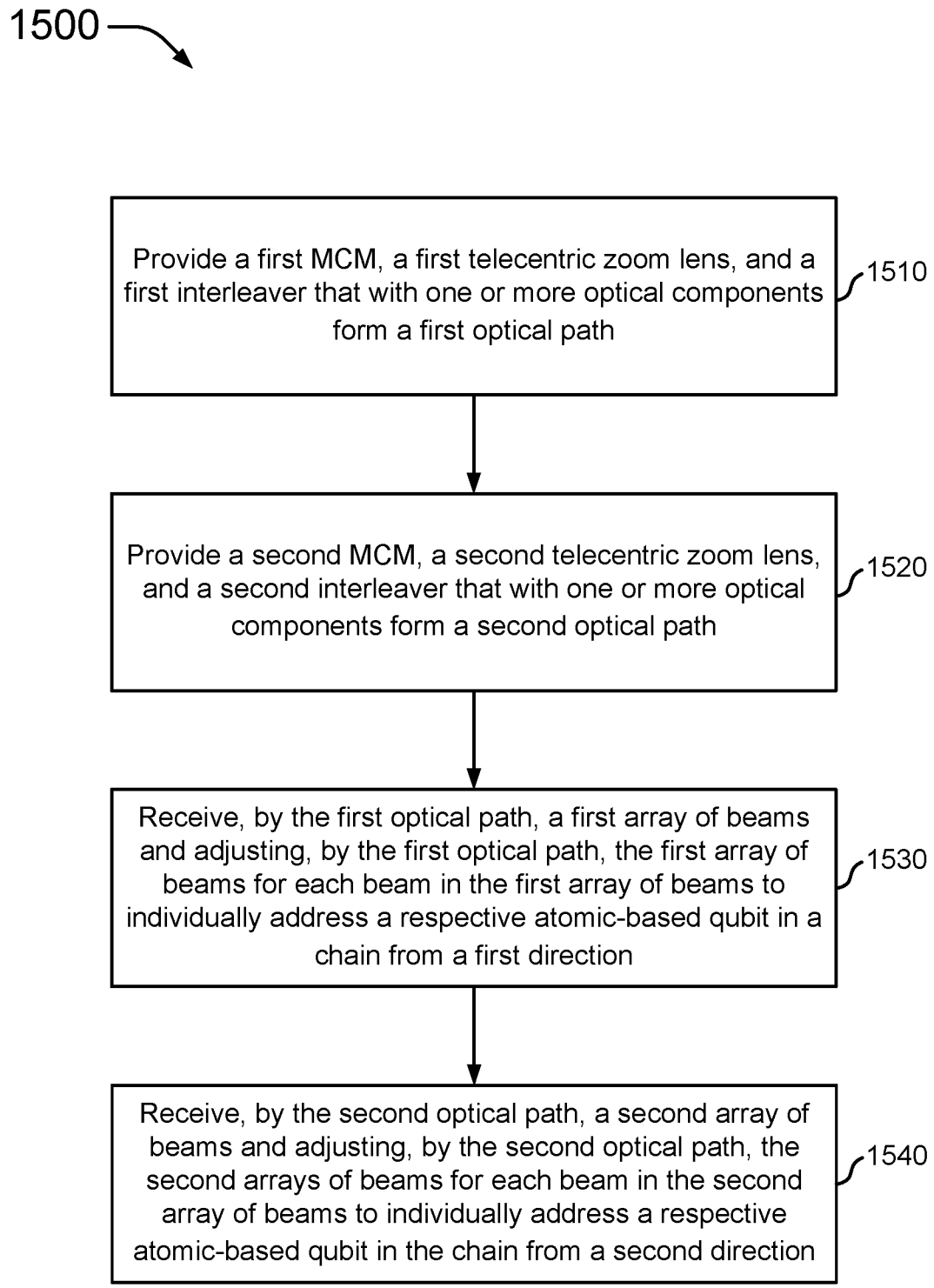
FIG. 15 illustrates a flow chart of a method for double individual-addressing of atomic-based qubits in a Raman system in accordance with aspects of this disclosure.

FIG. 15 illustrates a flow chart of a method 1500 for double individual-addressing of atomic-based qubits in a Raman system.

In 1510, a first MCM, a first telecentric zoom lens, and a first interleaver are provide which, with one or more optical components, form a first optical path. In one example, the first optical path may refer to an optical path associated with the left Raman portion of a Raman system as shown in FIG. 9.

In 1520, a second MCM, a second telecentric zoom lens, and a second interleaver are provided which, with one or more optical components, form a second optical path. In one example, the second optical path may refer to an optical path associated with the right Raman portion of a Raman system as shown in FIG. 9.

In 1530, the first optical path receives a first array of beams and adjusts or manipulates the first array of beams such that each beam in the first array of beams individually addresses a respective atomic-based qubit in a chain (e.g., a respective qubit in the qubits 960 in FIG. 9) from a first direction.

In 1540, the second optical path receives a second array of beams and adjusts or manipulates the second arrays of beams such that each beam in the second array of beams individually addresses a respective atomic-based qubit in the chain from a second direction.

In an aspect of the method 1500, each beam in the first array of beams is an elliptical beam, each beam in the second array of beams is an elliptical beam, and corresponding elliptical beams from the first array of beams and from the second array of beams substantially overlap.

In an aspect of the method 1500, the method 1500 further includes independently controlling, in each channel of the first multi-channel MCM, one or more characteristics of the respective beam of the first array of beams applied to that channel, and independently controlling, in each channel of the second multi-channel MCM, one or more characteristics of the respective beam of the second array of beams applied to that channel.

In an aspect of the method 1500, the method 1500 further includes adjusting, by the first optical path, a beam spacing of the first array of beams to match a spacing of the atomic-based qubits in the chain, and adjusting, by the second optical path, a beam spacing of the second array of beams to match a spacing of the atomic-based qubits in the chain.

In an aspect of the method 1500, the first array of beams includes a first subset of beams and a second subset of beams, and the second array of beams includes a first subset of beams and a second subset of beams, and the method 1500 further includes adjusting, by the first interleaver, a position of the beams in the first array of beams such that beams from the first subset of beams and beams from the second subset of beams alternate and have a reduced beam spacing at an output of the first interleaver, and adjusting, by the second interleaver, a position of the beams in the second array of beams such that the beams from the first subset of beams and beams from the second subset of beams alternate and have a reduced beam spacing at an output of the second interleaver.

The previous description of the disclosure is provided to enable a person skilled in the art to make or use the disclosure. Various modifications to the disclosure will be readily apparent to those skilled in the art, and the common principles defined herein can be applied to other variations without departing from the scope of the disclosure. Furthermore, although elements of the described aspects can be described or claimed in the singular, the plural is contemplated unless limitation to the singular is explicitly stated. Additionally, all or a portion of any aspect can be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A Raman system for double individual-addressing of atomic-based qubits, comprising:
a first multi-channel modulator (MCM), a first telecentric zoom lens, and a first interleaver that with one or more optical components form a first optical path of the Raman system and are configured to receive a first array of beams and to adjust the first array of beams for each beam in the first array of beams to individually address a respective atomic-based qubit in a chain from a first direction; and
a second MCM, a second telecentric zoom lens, and a second interleaver that with one or more optical components form a second optical path of the Raman system and are configured to receive a second array of beams and to adjust the second arrays of beams for each beam in the second array of beams to individually address a respective atomic-based qubit in the chain from a second direction different from the first direction.

2. The Raman system of claim 1, wherein:
each beam in the first array of beams is an elliptical beam,
each beam in the second array of beams is an elliptical beam, and
corresponding elliptical beams from the first array of beams and from the second array of beams substantially overlap.

3. The Raman system of claim 2, wherein the elliptical beams are Gaussian beams.

4. The Raman system of claim 1, wherein the first optical path and the second optical path are symmetrical.

5. The Raman system of claim 1, further comprising:
a laser source; and
a first diffractive optical element (DOE) and a second DOE, the laser source is configured to generate a single beam, the single beam is split and a portion is provided to the first DOE and the first DOE is configured to generate the first array of beams from the portion of the single beam, and a remaining portion of single beam is provided to the second DOE and the second DOE is configured to generate the second array of beams from the remaining portion of the single beam.

6. The Raman system of claim 1, wherein:
the first MCM is a first multi-channel acousto-optic modulator (AOM), and
the second MCM is a second multi-channel AOM.

7. The Raman system of claim 6, wherein:
the channels in the first multi-channel AOM include one channel for each of the beams in the first array of beams, each channel in the first multi-channel AOM is configured to independently control one or more characteristics of the respective one of the first array of beams applied to that channel, and
the channels in the second multi-channel AOM include one channel for each of the beams in the second set of beams, each channel in the second multi-channel AOM is configured to independently control one or more characteristics of the respective one of the first array of beams applied to that channel.

8. The Raman system of claim 6, wherein:
the first array of beams received by the first optical path has a beam spacing that matches a spacing between the channels in the first multi-channel AOM,
the second array of beams received by the second optical path has a beam spacing that matches a spacing between the channels in the second multi-channel AOM,
the first optical path is configured to adjust the beam spacing of the first array of beams to match a spacing of the atomic-based qubits in the chain, and
the second optical path is configured to adjust the beam spacing of the second array of beams to match the spacing of the atomic-based qubits in the chain.

9. The Raman system of claim 8, wherein:
the first optical path is further configured to adjust a beam size of the beams in the first array of beams according to an optimal size of the atomic-based qubits in the chain, and
the second optical path is further configured to adjust a beam size of the beams in the second array of beams according to the optimal size of the atomic-based qubits in the chain.

10. The Raman system of claim 1, wherein each of the first telecentric zoom lens and the second telecentric zoom lens has an outer pair of lenses and an inner pair of lenses, the outer pair of lenses is of fixed position and the inner pair of lenses is configured to move together to adjust an optical characteristic or the inner pair of lenses is of fixed position and the outer pair of lenses is configured to move together to adjust the optical characteristic.

11. The Raman system of claim 1, wherein:
the first array of beams includes a first subset of beams and a second subset of beams, the first interleaver is configured to optically adjust a position of the beams in the first array of beams such that beams from the first subset of beams and beams from the second subset of beams alternate and have a reduced beam spacing at an output of the first interleaver, and
the second array of beams includes a first subset of beams and a second subset of beams, the second interleaver is configured to optically adjust a position of the beams in the second array of beams such that beams from the first subset of beams and beams from the second subset of beams alternate and have a reduced beam spacing at an output of the second interleaver.

12. The Raman system of claim 11, wherein:
the first interleaver includes a first path for the first subset of beams from the first array of beams and a second path for the second subset of beams from the first array of beams, and
the second interleaver includes a first path for the first subset of beams from the second array of beams and a second path for the second subset of beams from the second array of beams.

13. The Raman system of claim 1, wherein:
the first optical path is further formed by a first reflective dove prism, and
the second optical path is further formed by a second reflective dove prism.

14. The Raman system of claim 1, wherein the first direction for each beam of the first array of beams to individually address the respective atomic-based qubit in the chain is opposite to the second direction for each beam of the second array of beams to individually address the respective atomic-based qubit in the chain.

15. The Raman system of claim 1, wherein each of the atomic-based qubits in the chain is an ion.

16. A method for double individual-addressing of atomic-based qubits in a Raman system, comprising:
providing a first multi-channel modulator (MCM), a first telecentric zoom lens, and a first interleaver that with one or more optical components form a first optical path,
providing a second MCM, a second telecentric zoom lens, and a second interleaver that with one or more optical components form a second optical path,
receiving, by the first optical path, a first array of beams and adjusting, by the first optical path, the first array of beams for each beam in the first array of beams to individually address a respective atomic-based qubit in a chain from a first direction; and
receiving, by the second optical path, a second array of beams and adjusting, by the second optical path, the second array of beams for each beam in the second array of beams to individually address a respective atomic-based qubit in the chain from a second direction.

17. The method of claim 16, wherein:
each beam in the first array of beams is an elliptical beam,
each beam in the second array of beams is an elliptical beam, and
corresponding elliptical beams from the first array of beams and from the second array of beams substantially overlap.

18. The method of claim 16, further comprising:
independently controlling, in each channel of the first multi-channel MCM, one or more characteristics of the respective beam of the first array of beams applied to that channel; and
independently controlling, in each channel of the second multi-channel MCM, one or more characteristics of the respective beam of the second array of beams applied to that channel.

19. The method of claim 16, further comprising:
adjusting, by the first optical path, a beam spacing of the first array of beams to match a spacing of the atomic-based qubits in the chain; and
adjusting, by the second optical path, a beam spacing of the second array of beams to match a spacing of the atomic-based qubits in the chain.

20. The method of claim 16, wherein:
the first array of beams includes a first subset of beams and a second subset of beams, and
the second array of beams includes a first subset of beams and a second subset of beams,
the method further comprising:
adjusting, by the first interleaver, a position of the beams in the first array of beams such that beams from the first subset of beams and beams from the second subset of beams alternate and have a reduced beam spacing at an output of the first interleaver; and
adjusting, by the second interleaver, a position of the beams in the second array of beams such that the beams from the first subset of beams and beams from the second subset of beams alternate and have a reduced beam spacing at an output of the second interleaver.

* * * * *